US011721120B1

(12) United States Patent
Parthe et al.

(10) Patent No.: US 11,721,120 B1
(45) Date of Patent: Aug. 8, 2023

(54) CONTACTLESS FINGERPRINT CAPTURE USING ARTIFICIAL INTELLIGENCE AND IMAGE PROCESSING ON INTEGRATED CAMERA SYSTEMS

(71) Applicants: Rahul Parthe, Bloomfield Hills, MI (US); Vishesh Mistry, Alpharetta, GA (US); Debayan Deb, Okemos, MI (US)

(72) Inventors: Rahul Parthe, Bloomfield Hills, MI (US); Vishesh Mistry, Alpharetta, GA (US); Debayan Deb, Okemos, MI (US)

( * ) Notice: Subject to any disclaimer, the term of this patent is extended or adjusted under 35 U.S.C. 154(b) by 0 days.

(21) Appl. No.: 17/967,563

(22) Filed: Oct. 17, 2022

Related U.S. Application Data

(60) Provisional application No. 63/342,308, filed on May 16, 2022.

(51) Int. Cl.
*G06K 9/00* (2022.01)
*G06V 40/13* (2022.01)
*G06V 40/12* (2022.01)
*G06V 40/60* (2022.01)
*G06V 10/82* (2022.01)

(52) U.S. Cl.
CPC .......... *G06V 40/1312* (2022.01); *G06V 10/82* (2022.01); *G06V 40/1347* (2022.01); *G06V 40/1365* (2022.01); *G06V 40/1388* (2022.01); *G06V 40/60* (2022.01)

(58) Field of Classification Search
CPC .......... G06V 40/1312; G06V 40/1365; G06V 40/60; G06V 10/82; G06V 40/1347; G06V 40/1388; G06V 40/113
USPC ........................................................ 382/124
See application file for complete search history.

(56) References Cited

U.S. PATENT DOCUMENTS

2012/0051605 A1* 3/2012 Nagar .................. G06V 40/113
382/124

* cited by examiner

*Primary Examiner* — Abdul-Samad A Adediran
(74) *Attorney, Agent, or Firm* — Andrew S. Rapacke

(57) ABSTRACT

A fingerprinting solution that uses neural network (NN) based trained Machine Learning (ML) modules in combination with traditional image processing for contactless fingerprint capture, liveness detection to rule out fake fingers, and fingerprint matching using a portable handheld device with integrated camera, thereby eliminating the need for a special device dedicated for fingerprinting. The trained NN modules detect the size and direction of fingers in the captured image, check if fingers are reversed in the image (thereby making nails visible), check if the thumb of the correct hand is captured, and generate fixed-length fingerprint templates for subsequent matching of fingerprints. Three dimensional (3D) depth map of a finger is used to bring the fingerprint resolution to 500 dpi and eliminate distortion caused by the curvature of the finger shape to improve accuracy while scaling and flattening a fingerprint image. The solution facilitates contactless-to-contactless as well as contactless-to-contact based fingerprint matching.

20 Claims, 8 Drawing Sheets

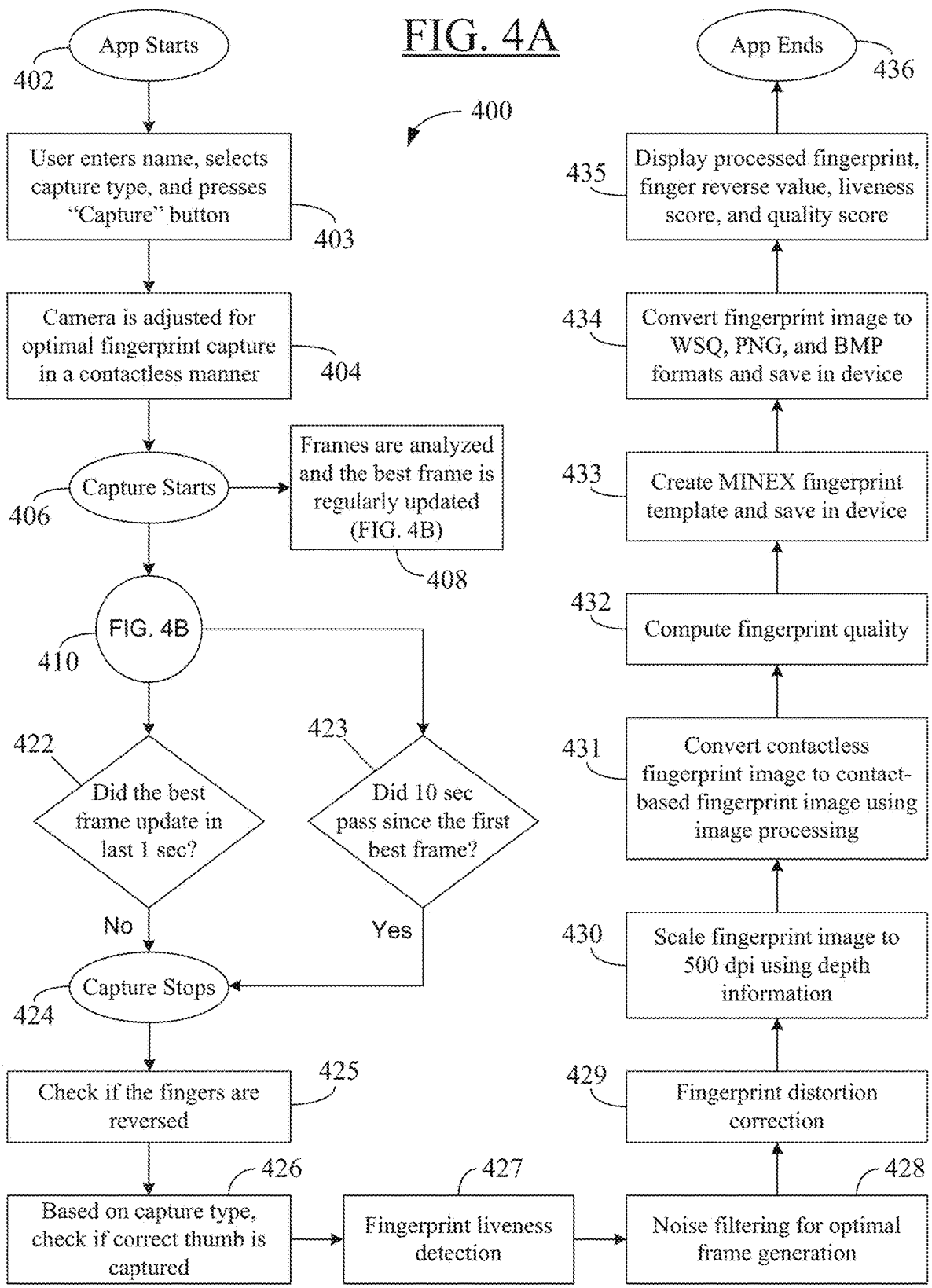

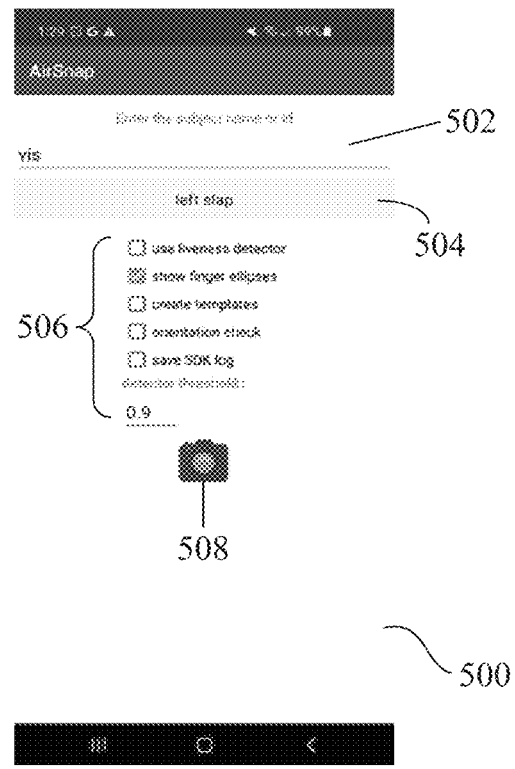
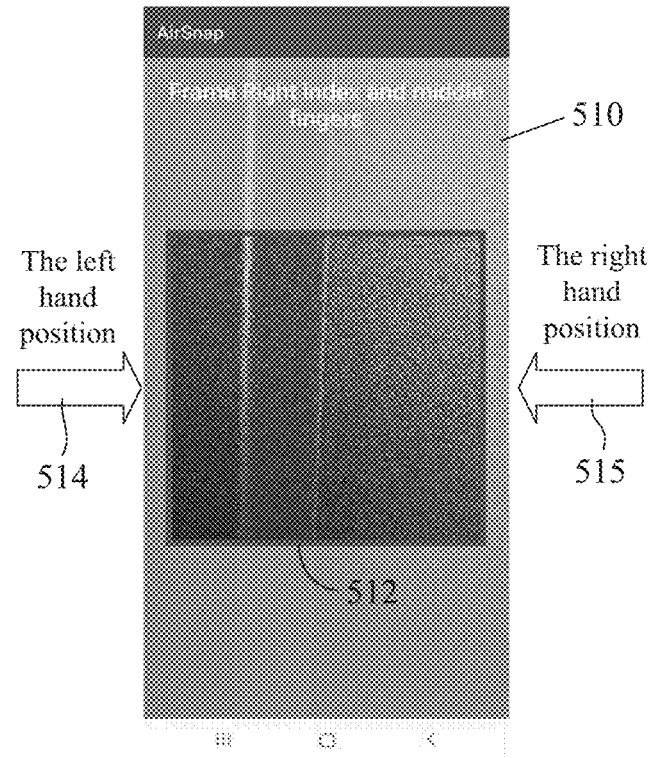
FIG. 5A
FIG. 5B
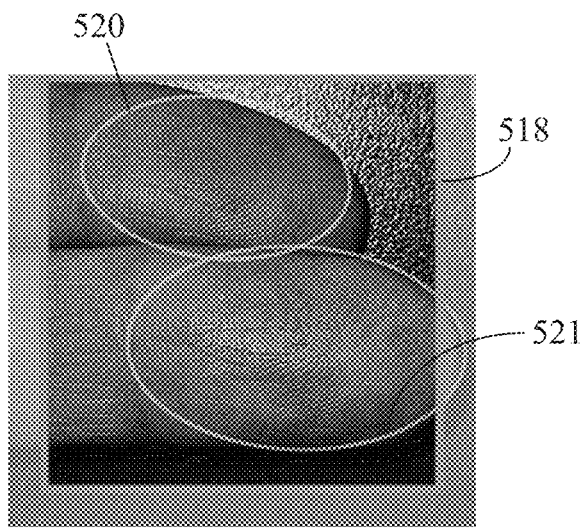
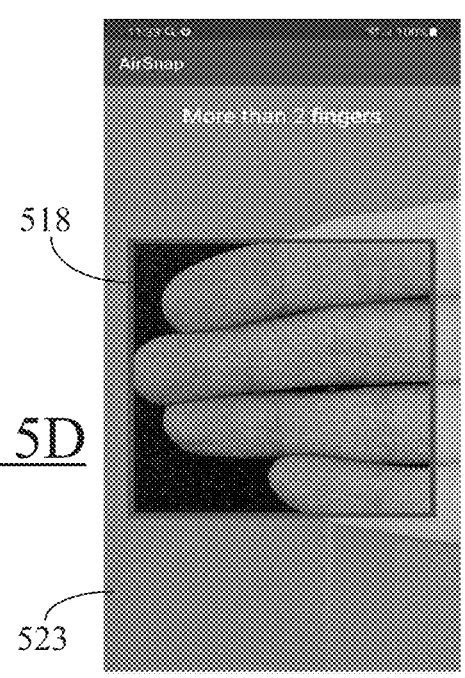
FIG. 5C
FIG. 5D

CONTACTLESS FINGERPRINT CAPTURE USING ARTIFICIAL INTELLIGENCE AND IMAGE PROCESSING ON INTEGRATED CAMERA SYSTEMS

TECHNICAL FIELD

This disclosure relates generally to biometric identification and authentication, and more specifically to a software-based system and method that captures optical images of human fingerprints in a contactless manner and processes the images using artificial intelligence (AI) in combination with traditional image processing.

BACKGROUND

Biometrics are body measurements and calculations related to human characteristics. Biometric authentication is used to identify individuals for a number of different purposes—such as, for example, travel safety, receipt of government benefits, law enforcement, surveillance of criminal activities, and so on. Biometric identifiers are the distinctive, measurable characteristics used to label and describe individuals. Biometric identifiers may be categorized as physiological characteristics and behavioral characteristics. Physiological characteristics are typically related to the biology of the human body such as, for example, fingerprints, palm veins, face recognition, hand geometry, iris recognition, retina scan, and so on. On the other hand, behavioral characteristics are related to the pattern of behavior of a person such as, for example, typing rhythm, gait, signature, movement of a computer mouse, and so on.

Human fingerprints are detailed, nearly unique, difficult to alter, and durable over the life of an individual, making them suitable as long-term markers of human identity. They may be employed by police or other authorities to identify individuals who wish to conceal their identity, trace a criminal, or to identify people who are incapacitated or deceased and thus unable to identify themselves, as in the aftermath of a natural disaster. Fingerprint image acquisition is considered to be the most critical step in an automated fingerprint authentication system, as it determines the final fingerprint image quality, which has a drastic effect on the overall system performance. There are different types of fingerprint readers on the market, but the basic idea behind each is to measure the physical difference between ridges and valleys in a fingerprint.

Fingerprint readers may deploy contact-based imaging or contactless imaging. In contact-based capturing of a fingerprint image of a person using a sensor (of the fingerprint reader), the person may be required to roll or touch with the finger(s) onto the sensing area, which, according to the physical principle in use (such as optical, ultrasonic, capacitive, or thermal sensors), may capture the difference between valleys and ridges of the finger(s) being imaged. In this manner, a three dimensional (3D) object (the finger) is "projected" onto a two dimensional (2D) flat plane of the sensor, resulting in a 2D image capture of the fingerprint. On the other hand, in contactless imaging, non-contact or touchless 3D fingerprint scanners may be used to acquire detailed 3D information of a finger without requiring the finger to physically touch or contact the scanner surface. Thus, 3D fingerprint scanners take a digital approach to the analog process of pressing or rolling the finger. By modeling the 3D depth of a finger in terms of the distance between neighboring points on a finger, the fingerprint can be imaged at a resolution high enough to record all the necessary detail.

SUMMARY

This Summary provides a simplified form of concepts that are further described below in the Detailed Description. This Summary is not intended to identify key or essential features and should therefore not be used for determining or limiting the scope of the claimed subject matter.

In the contact-based fingerprint capture mentioned before, when a finger touches or rolls onto the sensor surface, the elastic skin of the finger deforms. The quantity and direction of the pressure applied by the user, the skin conditions, and the projection of an irregular 3D object (the finger) onto a 2D flat plane may introduce distortions, noise, and inconsistencies in the captured fingerprint image. These problems result in inconsistent and non-uniform irregularities in the image. During each acquisition, therefore, the results of the imaging are different and uncontrollable. The representation of the same fingerprint may change every time the finger is placed on the sensor plate, increasing the complexity of any attempt to match fingerprints, thereby impairing the system performance and consequently limiting the widespread use of this biometric technology. Additionally, for contact-based fingerprinting, a special device/sensor may be required. This necessity of a special equipment may pose a cumbersome requirement, for example, for a police officer who needs to collect and process multiple fingerprints in the field.

Although the above-noted problems are largely avoided in the contactless fingerprint capture, traditional contactless fingerprint imaging techniques are still plagued with a number of other problems. For example, 3D contactless imaging using only traditional image processing algorithms results in less accurate and less robust detection and processing of fingerprints. Frequently, the final output fingerprint images lack clear fingerprint ridge lines, thereby missing out a significant amount of information present in the finger. These final output images also may not be compliant with the International Organization for Standardization 19794-2/4 (ISO 19794-2/4) standards. Furthermore, many contactless fingerprint imaging solutions do not take into account the 3D nature of the capture in which the center part of a fingerprint is closer to the imaging camera than the edges of the fingerprint. This spatial distortion creates a domain gap between contactless and contact-based fingerprints of the same finger because such distortion is typically not present in contact-based imaging where the finger is pressed flat against the flat scanner surface.

It is therefore desirable to devise a fingerprinting application that obviates the need for any special equipment, but rather leverages cameras integrated in modern mobile devices to capture finger images in a contactless manner and extract fingerprint images that are compatible with legacy (contact-based) scanners and relevant ISO standards. It is further desirable that the functionality of the fingerprinting application be not limited by the implementer's (or application user's) subjective knowledge so as to accomplish robust detection and matching of fingerprint patterns and achieve high tolerance to varying conditions of fingerprint capture. Additionally, it is also desirable to be able to correct the above-mentioned spatial distortion (3D perspective to 2D perspective) and detect fake fingers.

As a solution, particular embodiments of the present disclosure relate to a software application that uses AI and Machine Learning (ML) in combination with traditional image processing for contactless fingerprint capture, liveness detection, and fingerprint matching using a portable handheld device (such as a smartphone, a tablet, or a laptop), thereby eliminating the need for a special device dedicated for fingerprinting. This also reduces the number of special equipments a police officer must carry in the field. Furthermore, the software application also performs crucial domain-specific tasks such as fingertip/nail detection, image cropping, and identity-coupled feature extractions in an accurate and robust manner without being limited by the implementer's subject knowledge. In certain embodiments, the application is deployed on a user's (such as a police officer's) mobile device with an integrated camera and includes four neural network (NN) based trained ML modules that collectively, cooperatively, and efficiently perform fingerprint capture and processing as per teachings of the present disclosure.

Initially, the software application may provide the user with an option to select a type of fingerprint capture—such as, for example, a left/right slap, a left/right index finger, a left/right thumb, and the like. The capture then may be carried out in real time. For the selected capture type, appropriate fingers may be detected, segmented, and processed by the application using trained NN modules along with traditional image processing algorithms. For example, in certain embodiments, one NN module may detect the size and direction of fingers in the captured image, another NN module may check if fingers are reversed in the image (thereby making nails visible), a third NN module may check if the thumb of the correct hand is captured (in the event thumb capture is selected by the user), and a fourth NN module may generate fixed-length fingerprint templates for subsequent matching of fingerprints. In particular embodiments, as part of image processing, the software application may perform liveness detection to rule out fake fingers. The software application also may use a 3D depth map of a finger to bring the fingerprint resolution close to 500 dpi (dots per inch) and eliminate the earlier-mentioned spatial distortion caused by the curvature of the finger shape so as to improve accuracy while scaling and flattening a fingerprint image to resemble a contact-based fingerprint image from a legacy fingerprint reader/scanner. In some embodiments, the processed contactless images may be stored in a number of standardized data storage formats. Thus, the extracted fingerprint images remain compatible with outputs of legacy (contact-based) scanners and relevant ISO standards. In particular embodiments, the software application also may facilitate contactless-to-contactless fingerprint matching as well as contactless-to-contact fingerprint matching. Such matching may be performed locally on the user's mobile device or at a remote server.

In one embodiment, the present disclosure is directed to a method, which comprises: (i) capturing, by a computing system and in a contactless manner, an optical image of a portion of a palm of a hand; (ii) extracting, by the computing system, a plurality of finger-specific visual landmarks for each finger in the captured image using a first NN module; (iii) detecting, by the computing system, a size and a direction of each finger in the captured image based on the plurality of finger-specific visual landmarks; (iv) cropping, by the computing system, the captured image based on the size and the direction of each finger therein to thereby generate a cropped image; (v) processing, by the computing system and using a second and a third NN modules, the cropped image to obtain a processed contactless image; (vi) generating, by the computing system and using a fourth NN module, a finger-specific fingerprint template for each finger using the processed contactless fingerprint image, wherein each finger-specific fingerprint template is a feature vector of identical dimension; and (vii) storing, by the computing system, each finger-specific fingerprint template in a memory of the computing system. In particular embodiments, the computing system may be a User Equipment (UE) or other mobile device. In one embodiment, as part of the method, the computing system also may compare two fingerprint templates stored in its memory and determine whether the compared templates match with each other or not.

In another embodiment, the present disclosure is directed to a method, which comprises receiving, by a first computing system, a processed contactless image of a finger of a person to be fingerprinted, wherein the processed contactless image is generated by a second computing system by: (a) capturing an optical image of the finger in a contactless manner, (b) extracting a plurality of visual landmarks for the finger in the captured image using a first NN module, (c) detecting a size and a direction of the finger in the captured image based on the plurality of visual landmarks, (d) cropping the captured image based on the size and the direction of the finger therein to thereby generate a cropped image, and (e) processing the cropped image using a second and third NN modules to obtain the processed contactless image. In particular embodiments, the first computing system may be a remote server and the second computing system may be a mobile device of a user (such as a police officer). The method further comprises: (i) generating, by the first computing system and using a fourth NN module, a fingerprint template for the finger in the processed contactless image using the processed contactless fingerprint image, wherein the fingerprint template is a feature vector whose length is fixed and independent of number of minutiae points in the plurality of minutiae points; and (ii) storing, by the first computing system, the fingerprint template in a memory of the first computing system. In one embodiment, as part of the method, the first computing system may compare two fingerprint templates using a cosine similarity function to determine if they match or not.

In a further embodiment, the present disclosure is directed to a mobile device that comprises: a camera; a memory for storing program instructions comprising a first NN module, a second NN module, a third NN module, and a fourth NN module; and a processor coupled to the camera and to the memory. In the mobile device, the processor executes the program instructions and performs the following upon execution of the program instructions: (i) captures, using the camera, an optical image of at least one finger of a hand in a contactless manner; (ii) extracts a plurality of finger-specific visual landmarks for each finger in the captured image using the first NN module; (iii) detects a size and a direction of each finger in the captured image based on the plurality of finger-specific visual landmarks; (iv) crops the captured image based on the size and the direction of each finger therein to thereby generate a cropped image; (v) processes the cropped image using the second and the third NN modules to obtain a processed contactless image; (vi) generates, using the fourth NN module, a finger-specific fingerprint template for each finger in the processed contactless image using the processed contactless fingerprint image, wherein each finger-specific fingerprint template is a feature vector of identical dimension; and (vii) stores each finger-specific fingerprint template in the memory. In one embodiment, the processor in the mobile device also may compare two fingerprint templates stored in its memory and determine whether the compared templates match with each other or not.

Thus, the AI-based software application increases the scalability of fingerprint-based solutions while reducing the dependency on purpose-built hardware that traditionally drives up costs in large-scale projects—such as, for example, when making such solutions available to police departments nationwide. The NN modules provide an accurate, reliable, and generalizable solution for contactless fingerprint detection and matching tasks using a consumer mobile device with an integrated camera. The combination of AI-based and traditional image processing in the software application results in high quality and speed—both in image capture and image processing—that efficiently prepares biometric (fingerprint) data for further processing in compliance with interoperability/ISO standards.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIGS. 4A-4B depict exemplary flowcharts providing details of various tasks performed by the ACF application to facilitate contactless fingerprinting as per particular embodiments of the present disclosure.

FIGS. 5A-5K show exemplary screenshots of various displays and alerts that may be provided to a user in real-time by the ACF application during contactless fingerprinting as per certain embodiments of the present disclosure.

DETAILED DESCRIPTION

Figure 1:
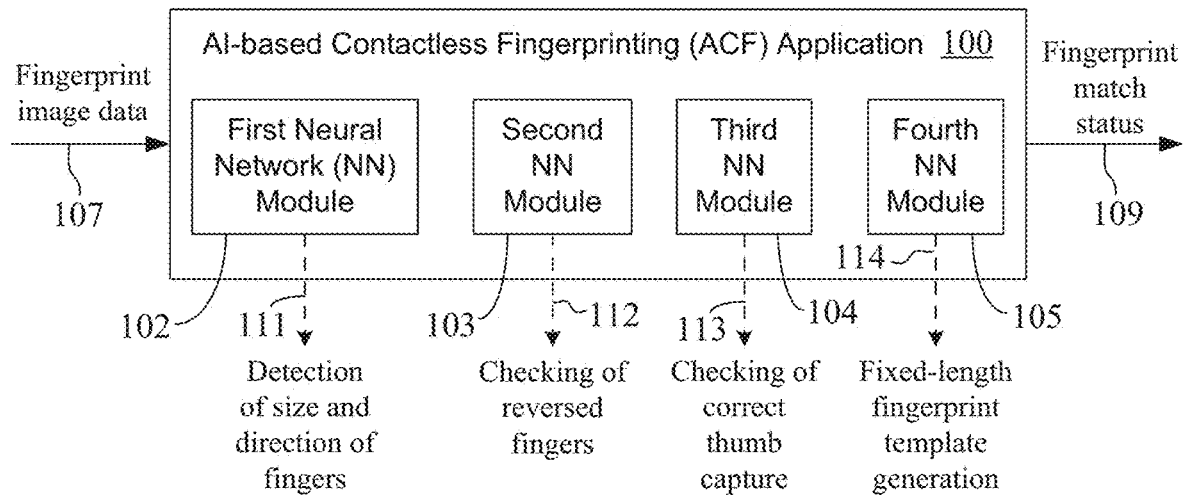
FIG. 1 illustrates constituent components of an AI-based Contactless Fingerprinting (ACF) application according to particular embodiments of the present disclosure.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the teachings of the present disclosure. Furthermore, this disclosure provides various example implementations or embodiments, as described, and as illustrated in the drawings. However, this disclosure is not limited to the implementations described and illustrated herein, but can extend to other implementations, as would be known or as would become known to those skilled in the art.

Reference throughout this specification to "one embodiment," "particular embodiments," "this implementation," "some embodiments," or other terms of similar import, means that a particular feature, structure, or characteristic described in connection with the embodiment is included in at least one embodiment or implementation of the present disclosure. Thus, the appearances of these phrases in various places throughout this specification are not necessarily all referring to the same implementation/embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "real-time," "AI-based", "pre-defined," etc.) may be occasionally interchangeably used with its non-hyphenated version (e.g., "real time," "AI based", "predefined," etc.), and a capitalized entry (e.g., "User Equipment," "Neural Network," "Host System," etc.) may be interchangeably used with its non-capitalized version (e.g., "user equipment," "neural network," "host system," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline and/or wireless means) information signals (whether containing address, data, or control information) to/from the second entity regardless of the type (analog or digital) of those signals. It is further noted that various figures shown and discussed herein are for illustrative purpose only and are not drawn to scale.

The terms "first," "second," etc., as used herein, are used as labels for nouns that they precede, and do not imply any type of ordering (e.g., spatial, temporal, logical, etc.) unless explicitly defined as such. Furthermore, items or features appearing in different figures may be identified using the same reference numeral for ease of discussion. However, such identification does not imply that the commonly-referenced items/features are identical across all embodiments.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

In the discussion herein, the terms "remote server," "third party platform", "remote host," and "host system" may be used interchangeably merely for ease of description. Similarly, the terms "user" and "operator" may be used interchangeably even if the user or operator does not actually own, operate, or control the portable handheld device deploying the ACF application of the present disclosure or a portion of the ACF application. Depending on the context of discussion, the terms "user" or "operator" generally may refer to a human that is either the actual person whose fingerprints are being captured or a third party—such as a police officer— operating the portable device with the ACF application (or a portion thereof) to capture relevant fingerprints as per teachings of the present disclosure. It is observed that the person whose fingerprints are being captured may be a live person or a dead person. Furthermore, it is understood that in many cases the identity of such a person may be unknown.

It is noted that, for ease of discussion, the term "finger" is also used to refer to a thumb, unless indicated otherwise or evident from the context of discussion. Additionally, it is pointed out that in many instances fingerprint capture and matching may be real-time operations. For example, in the context of fingerprinting at a crime scene, the user (or police officer) may expect a real-time interpretation of captured fingerprint(s) and corresponding real-time identification of the criminal(s) based on real-time matching of fingerprints. Therefore, the present disclosure also covers such real-time operations. Due to minor processing delays inherent in any electronic data processing operation, in the present disclosure, an action, transaction, task, or operation may be considered to be in "real-time" so long as it is perceived as such by the user in the context of the user's interaction with the fingerprinting device. The terms "substantially in real-time," "in near real-time", or "essentially in real-time" may be considered equivalent to the term "real-time" in view of the relatively insignificant delays inherent in electronic data processing and accepted worldwide by the users as part of their "real-time" experience.

FIG. 1 illustrates constituent components of an AI-based Contactless Fingerprinting (ACF) application 100 according to particular embodiments of the present disclosure. The ACF application 100 may be a software module having various distributed data processing functionalities discussed later below with reference to FIGS. 2-7. In certain embodiments, such as the embodiment in FIG. 2, all data processing may be performed locally in a mobile device. Whereas, in other embodiments, some portion of data processing may be performed locally in a mobile device and some other portion of data processing may be performed remotely on an online host system, as in case of the embodiment in FIG. 6. The ACF application 100 according to one embodiment of the present disclosure may include four NN-based trained ML modules 102-105. In certain embodiments, the ACF application 100 also may include traditional image processing modules (not shown). The NN modules 102-105 may operate along with the traditional image processing modules to collectively facilitate the AI-based contactless fingerprinting as per teachings of the present disclosure as discussed later. Briefly, the ACF application 100 may trigger a camera of a mobile device to capture an optical image of one or more fingers to be fingerprinted in a contactless manner. The ACF application 100 may operate on the incoming fingerprint image data at arrow 107 and generate an output at arrow 109 providing the results of fingerprint verification and matching, which may include identification of the person being fingerprinted. In certain embodiments, each NN module 102-105 may perform a corresponding intermediate task in the overall processing of fingerprint data, as illustrated by exemplary dotted arrows 111-114 in FIG. 1. For example, the first NN module 102 may detect the size and direction of finger(s) in the captured fingerprint image as noted at arrow 111; the second NN module 103 may check whether the fingers are reversed in the captured image (that is, whether fingernails are visible in the image) as noted at arrow 112; if a thumb print or impression is desired by the user, the third NN module 104 may check if the correct thumb (left hand or right hand) is captured or not, as noted at arrow 113; and the fourth NN module 105 may generate a finger-specific fingerprint template for each finger having a fixed length regardless of finger-specific minutiae points. The fixed-length fingerprint templates may be used for AI-based fingerprint matching. Additional details of these NN modules and tasks performed thereby are provided later with reference to discussion of FIGS. 4-5.

It is observed that the illustration of software modules 102-105 comprising the ACF application 100 in FIG. 1 is exemplary in nature. In other embodiments, additional or different software modules may comprise the ACF application 100. Similarly, in some embodiments, the execution of a task or operation may be partially shared between two or more software modules. However, for ease of discussion, such overlapping executions of tasks/operations are not identified and all internal communications among various software modules are not described.

Figure 2:
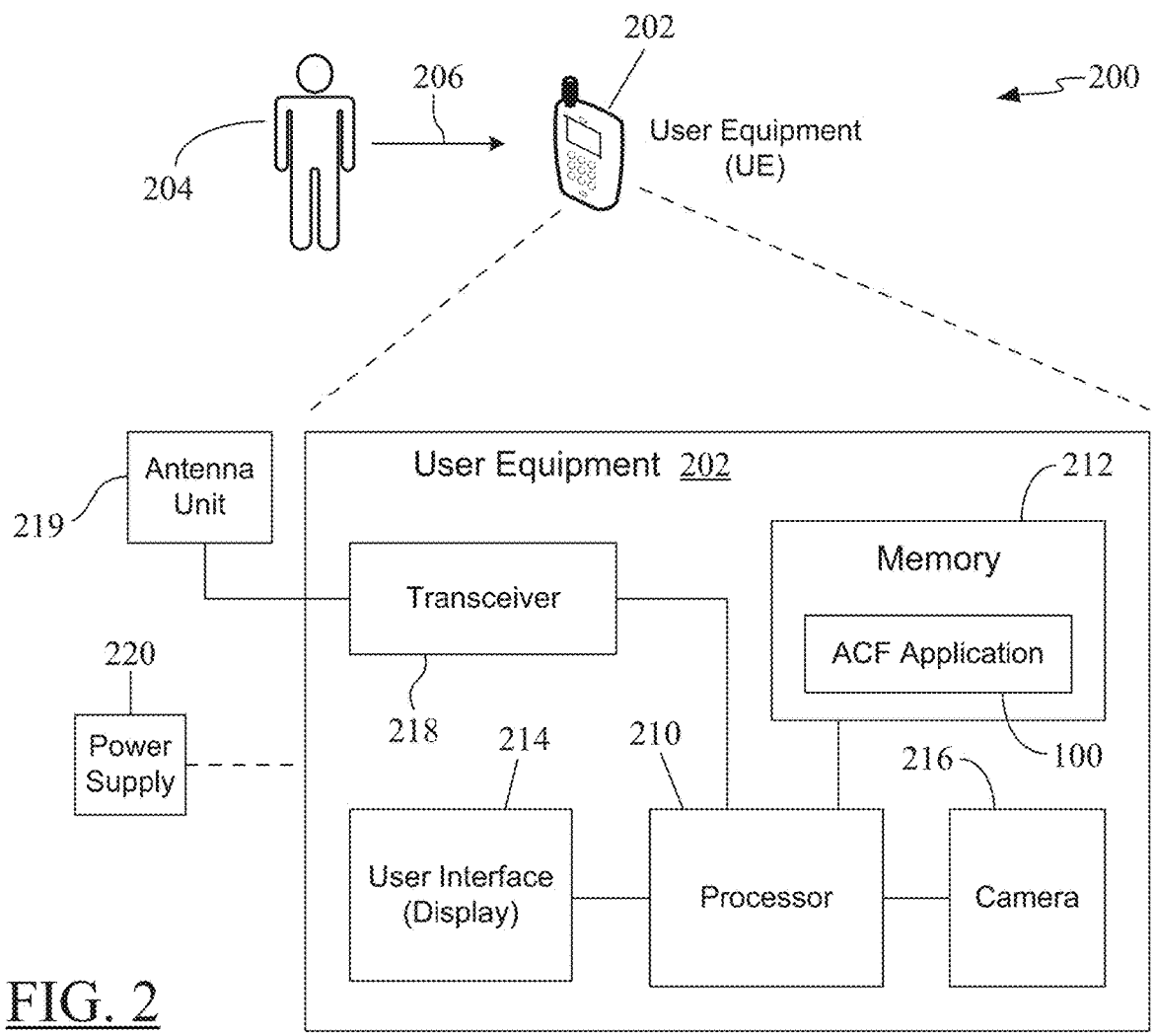
FIG. 2 depicts an exemplary system for implementing the ACF application as per certain embodiments of the present disclosure.

FIG. 2 depicts an exemplary system 200 for implementing the ACF application 100 as per certain embodiments of the present disclosure. In the system 200, a User Equipment (UE) 202 is shown to be performing contactless fingerprint capture of a human "subject" or user 204, as symbolically illustrated by an exemplary arrow 206. As mentioned earlier, in some embodiments, the user 204 itself may be the operator of the UE 202. In other embodiments, the operator may be another person—such as, for example, a police officer—that is in possession of the UE 202 and uses it to capture and process fingerprints of the user 204. It is noted here that the terms "portable handheld device," "portable handset," "mobile device," "user terminal," and "User Equipment (UE)" may be used interchangeably herein to refer to a wireless communication device that is capable of voice and/or data communication via a wireless carrier network and also capable of being mobile. Some examples of such mobile handsets/devices include cellular telephones or data transfer equipments (e.g., a Personal Digital Assistant (PDA) or a pager), smartphones (e.g., iPhone™, Android™, Blackberry™, etc.), tablet computers, laptops, Bluetooth® devices, or any other type of user devices capable of operating in a wireless environment. The carrier network may be a wireless communication network (e.g., a cellular network) facilitating voice and/or data communication between two user equipments (UEs).

The UE 202 may include a processor 210, a memory 212 (which may, in some embodiments, also include memory on UE's Subscriber Identity Module (SIM) card), a User Interface (UI) or display screen 214, an integrated camera unit 216, a transceiver 218, and an antenna unit 219. All of these components may be provided within a housing, which also may be represented by the reference numeral "202." The memory 212 may include the program code for the entire ACF application 100—including all four NN modules 102-105—to facilitate local implementation of all functionalities of the ACF application 100. On the other hand, a remote implementation of some functionalities based on divided storage of various NN modules of the ACF application 100 is discussed later with reference to FIG. 6. The ACF application 100 may have been pre-packaged with the handset 202 or may have been downloaded by a user/operator into the memory 212. The program code of the ACF application 100 may be executed by the processor 210. Upon execution of the program code, the processor 210 may configure the UE 202 to perform various tasks associated with the contactless fingerprinting as per the teachings of the present disclosure. In one embodiment, such tasks may include, for example, the process steps illustrated in FIG. 3 as well as other tasks discussed later with reference to FIGS. 4-5. Such tasks may include, for example, activating the camera 216 in the UE 204 to capture fingerprint images of the user 204, cropping captured images based on the size and the direction of fingers therein, extracting features of each finger to generate finger-specific fingerprint templates, detecting fingerprint liveness, displaying alert messages and processed fingerprint image on the UI 214, and the like.

In particular embodiments, the processor 210 may be a relatively low-powered Central Processing Unit (CPU) executing a mobile operating system (or mobile OS) (e.g., Symbian™ OS, Palm™ OS, Windows Mobile™, Android™, Apple iOS™, etc.). Because of the battery-powered nature of mobile handsets, the processor 210 may be designed to conserve battery power and, hence, may not be as powerful as a full-functional computer or server CPU. The program code of the mobile OS (not show) may reside in the memory 212. Although not shown, it is observed that, in addition to the ACF application 100, the memory 212 of the UE 202 also may have one or more mobile applications resident therein. These mobile applications are software modules that may have been pre-packaged with the handset 202 or may have been downloaded by a user/operator into the memory 212. These mobile applications as well as the ACF application 100 may be executed by the processor 210 under the control of the mobile OS.

In addition to storing program codes of various software applications, the memory 212 also may store data related to fingerprint capture and processing operations including, for example, a database of fingerprint templates of various human subjects. In case of the embodiment of FIG. 6 (discussed later), the memory 212 also may store related communications received from a remote host system 602 as well as other content needed to facilitate contactless fingerprinting as per teachings of the present disclosure. For example, in one embodiment, the memory 212 may store, for example, selections entered by a user on the display screen 214 for the desired type of fingerprint capture, image frames containing fingerprinting data of the user 204, scaled version of fingerprint images, intermediate image processing results, final fingerprint images in multiple data storage formats, results of fingerprint matching operations performed at the remote host 602, and the like. In the embodiment of FIG. 2, the memory 212 may receive its fingerprint-related content as processed values generated upon execution of the ACF application 100 by the processor 210 at run-time.

It is noted here that the ACF application 100 may be configured to run on a variety of mobile operating systems. Hence, the user of the mobile device 202 may download the device-compatible version of the ACF application 100 from a third party's website—such as, for example, a vendor or provider of the fingerprinting software or services—via the UI 214. In particular embodiments, the UI 214 may be a touch-screen display. In some embodiments, the ACF application 100 may be considered Software as a Service (SaaS). This service may be offered for free to users or at a fee. In other embodiments, the functionality of the ACF application 100 may be offered to an entity—such as, for example, a police department—as a Platform as a Service (PaaS). As mentioned before, in one embodiment, the program code of the ACF application 100 may be offered as a downloadable mobile app or a browser add-on. In some embodiments, the program code of the ACF app 100 may be executed from within the web browser (not shown) of the UE 202 without the need to download the application 100 onto the user's system 202. In some embodiments, a program shortcut on the UI 214 may allow the user to download the VCI application 100 into the UE 204 for execution as an interface when performing fingerprinting.

The camera unit 216 may include the integrated/main camera of the mobile device 202. This camera may be used by the ACF application 100 to capture fingerprint images, as discussed later. For example, once the user 204 or another operator (such as a police officer) initiates the ACF application 100, it can interface with the UE's camera unit 216 to activate the camera of the UE 202. Additionally, the ACF application 100 also may activate the user interface or display screen 214 of the UE 202 so that the user 204 can view his/her fingerprint images captured by the camera unit 216 on the UE's display 214. In one embodiment, the UE 202 may be an iPhone™ with an RGB (Red, Green, Blue) camera 216 having an image sensor resolution of 1920× 1080 pixels and support for a 2× optical zoom. In some embodiments, the integrated camera in the camera unit 216 also may include a 12× LiDAR (Light Detection and Ranging) sensor, which may use infrared (IR) laser for 3D depth imaging through measurement of distance, for example, between various key points of a finger as discussed later below. In other embodiments, instead of LiDAR capability, the integrated camera in the camera unit 216 may be a Time of Flight (ToF) camera, which is a range imaging system employing time-of-flight techniques to resolve the distance between the camera and the subject (here, a finger) for each point of the subject's image (here, an image of a finger to be fingerprinted) by measuring the round-trip time of an artificial light signal provided by a laser or an LED (Light Emitting Diode). The LiDAR or ToF features may be used for depth measurements to build a 3D depth map of each imaged finger. As discussed later, the depth map may be used to calculate the dpi values for the fingerprint images, permitting the accurate scaling of images to 500 dpi resolution and eliminate the fingerprint distortion caused by the curvature of the finger shape.

The transceiver 218 may communicate with the processor 210 to perform transmission/reception of data, control, or other signaling information (via the antenna unit 219) to/from any remote server or other computing system with which the UE 202 may be in communication. In particular embodiments like the embodiment in FIG. 6, the transceiver 218 may support wireless communication with another computing system through a communication network, such as the Internet, to implement the fingerprint matching methodology as per the teachings of the present disclosure. The transceiver 218 may support different types of wireless connections such as, for example, a cellular network connection, a Wi-Fi connection, a Bluetooth® connection, and the like. The mobile OS, mobile applications, and the ACF application 100 may utilize the transceiver 218 as needed. The transceiver 218 may be a single unit or may comprise of two separate units—a transmitter (not shown) and a receiver (not shown). The antenna unit 219 may include one or more antennas. Alternative embodiments of the wireless device 202 may include additional components responsible for providing additional functionality, including any of the functionality identified herein, such as, for example, capturing fingerprint images in a contactless manner, processing the captured images, displaying various notifications, images, or messages on the displays screen 214, etc., and/or any functionality necessary to support the solution as per the teachings of the present disclosure. For example, in one embodiment, the wireless device 202 also may include an on-board power supply unit 220 (e.g., a battery or other source of power) to allow the device to be operable in a mobile manner.

In particular embodiments, the program code of the ACF application 100 may include Application Programming Interfaces (APIs) to external programs or applications. For example, the ACF application 100 may include APIs for Android™ or iOS™ platforms to allow the ACF application 100 to work with the UE's camera 216, file system, and UI 214.

In one embodiment, the mobile device 202 may be configured (in hardware, via software, or both) to implement device-specific aspects of contactless fingerprinting as per teachings of the present disclosure. As previously noted, the software or program code may be part of the ACF app 100 and may be stored in the memory 212 and executable by the processor 210. For example, when existing hardware architecture of the device 202 cannot be modified, the functionality desired of the device 202 may be obtained through suitable programming of the processor 210 using the program code of the ACF app 100. The execution of the program code (by the processor 210) may cause the processor to perform as needed to support various aspects related to the contactless fingerprinting as per the teachings of the present disclosure. As a result, the UE 202 may operate as a special purpose system/device in which the computer program code of the ACF app 100 is executed by the processor 210 as a particular machine (or special purpose machine) configured for carrying out the operations and functions described in the implementations herein. Thus, although the wireless device 202 may be referred to as "performing," "accomplishing," or "carrying out" (or similar such other terms) a function/task or a process or a method step, such performance may be technically accomplished in hardware and/or software as desired.

In some embodiments, each of the system 202 in FIG. 2 and the system 602 (in FIG. 6, discussed later) may be a computing system. A computing system generally processes, compiles, stores, and/or communicates information or data for business, personal, or other purposes thereby allowing users or operators of the system to take advantage of the value of the information. Because technology and information handling need and requirements vary between different users or applications, computing systems may also vary regarding what information is handled, how the information is handled, how much information is processed, stored, or communicated, and how quickly and efficiently the information may be processed, stored, or communicated. The variations in computing systems allow for computing systems to be general or configured for a specific user or specific use such as fingerprint scanning/matching, online retail, financial transaction processing, airline reservations, enterprise data storage, or global communications. In addition, computing systems may include a variety of hardware and software components that may be configured to process, store, and communicate information and may include one or more computers, data storage systems, and networking systems.

Modern computing systems include many different types of consumer and commercial electronic devices such as, for example, personal computers (e.g., desktops or laptops), tablet computers, mobile devices (e.g., personal digital assistants (PDAs), User Equipments (UEs), or smart phones), corporate (or small business) server and data processing systems (e.g., blade server or rack server), a network storage device, and the like. These devices may vary in size, shape, performance, functionality, and price. In any event, almost all these modern devices are equipped with relevant hardware and software to allow their users/operators to access a communication network (such as the Internet) to perform online transactions (such as software downloads, data transfers, transmissions and downloads of fingerprint templates, and so on).

For purpose of this disclosure, a computing system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for personal, business, scientific, control, or other purposes. The computing system may include random access memory (RAM), one or more processing resources such as a central processing unit (CPU) or hardware or software control logic, read-only memory (ROM), and/or other types of nonvolatile memory. Additional components of the computing system may include one or more disk drives, one or more network ports for communicating with external devices as well as various input and output (I/O) devices, such as a keyboard, a mouse, touch-screen and/or video display. The computing system may also include one or more buses operable to transmit communications between its various hardware components.

Figure 3:
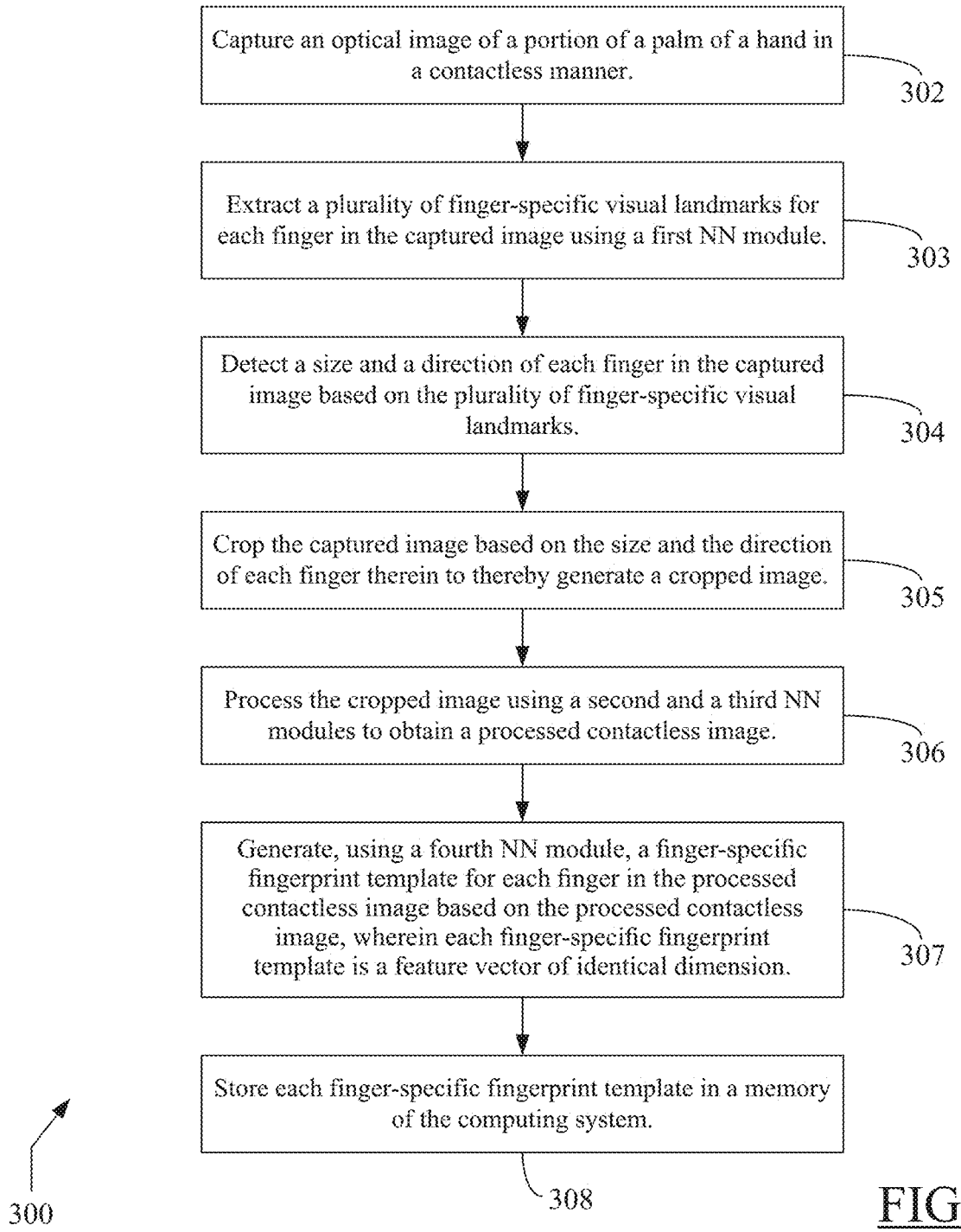
FIG. 3 shows an exemplary flowchart depicting various steps that may be performed by a computing system as per particular embodiments of the present disclosure to facilitate AI-based contactless fingerprinting as per teachings of the present disclosure.

FIG. 3 shows an exemplary flowchart 300 depicting various steps that may be performed by a computing system as per particular embodiments of the present disclosure to facilitate AI-based contactless fingerprinting as per teachings of the present disclosure. In certain embodiments, the computing system performing the tasks 302-308 in the flowchart 300 (and also the tasks in the flowcharts in FIGS. 4A-4B) may be the UE 202. It is noted that, in some embodiments, the steps/tasks 702-704 illustrated in the flowchart 700 in FIG. 7 (discussed later) may be considered complementary to the steps/tasks 302-306 in the flowchart 300 in FIG. 3. In that case, all of the tasks 302-306 and 702-704 may collectively accomplish the functionality of the ACF application 100. In some embodiments, the steps shown in the flowchart 700 of FIG. 7 primarily may be performed by the host system 602 in FIG. 6 (discussed later) in conjunction with the relevant steps performed by the UE 202 to collectively implement the functionality of the ACF application 100. Thus, the computing system in the context of the embodiment in FIG. 7 may be the host system 602. In other embodiments, the UE 202 and the host system 602 may jointly perform the steps in one or both of the flowcharts 300, 700. In any event, the computing system performing the tasks in FIGS. 3, 4A-4B, and 7 may include in hardware and/or software the functionality of the ACF application 100 or a relevant portion thereof, as applicable. In one embodiment, the program code of the ACF application 100 or that of its relevant software portion (as well as the program code for the OS of the respective computing system 202, 602) may be executed by a processor in the respective computing system 202, 602 and, upon execution of the program code, the corresponding computing system 202, 602 may be operative to perform the tasks illustrated in FIGS. 3, 4A-4B, and 7, either individually or collectively with the other computing system, as applicable.

In the flowcharts in FIGS. 3, 4A-4B, and 7, each block represents one or more tasks that can be implemented in hardware, software, or a combination thereof. In the context of software, the blocks represent computer-executable instructions that, when executed by one or more processors, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the processes shown in the flowcharts in FIGS. 3, 4A-4B, and 7. It is noted that, for discussion purpose, the process in the flowchart 300 (and also the process in the flowcharts in FIGS. 4A-4B) is described with reference to the system 200 in FIG. 2 as described above and the process in the flowchart 700 is described with reference to the system 600 in FIG. 6 as discussed later, although other models, frameworks, systems, and environments may be used to implement these processes.

Referring now to the flowchart 300 in FIG. 3, initially, the computing system (for example, the UE 202) may capture an optical image of a portion of a palm of a hand (of the user or subject 204) in a contactless manner. Such imaging may be performed using the integrated camera 216 of the UE 202 as noted before. The operator of the UE 202 may select the type of image capture and the ACF app 100 may trigger the camera 216 to capture the image of the relevant portion of the hand in accordance with the selected type of image capture as discussed in more detail later. The image capture at block 302 may be a real-time operation. At block 303, the computing system (such as the UE 202) may extract a plurality of finger-specific visual landmarks for each finger in the captured image using the first NN module 102 (FIG. 1) of the ACF app 100. Thereafter, at block 304, the computing system (such as the UE 202) may detect the size and the direction of each finger in the captured image (at block 302) based on the plurality of finger-specific visual landmarks (extracted at block 303). Consequently, at block 305, the computing system may crop the captured image based on the size and the direction of each finger therein to thereby generate a cropped image. In some embodiments, as discussed later, the task at block 305 may include the computing system displaying a finger-specific ellipse around each finger in the cropped image based on the detected size and direction of the finger to thereby visually identify the finger. The cropped image along with the ellipses may be displayed on the display screen 214 of the UE 202.

At block 306, the computing system (for example, the UE 202) may process the cropped image (generated at block 305) using the second and the third NN modules 103-104 (FIG. 1), respectively, to obtain a processed contactless image. In some embodiments and as discussed in more detail later, the processing task at block 306 may include determining whether the number of fingers detected in the cropped image are correct for the user-selected capture type, whether the optical image of the correct hand is captured for the user-selected capture type, whether each imaged finger is positioned at an acceptable distance from the UE's camera 216, whether a fingernail is visible in the cropped image, whether the thumb of a correct hand is captured in the optical image (at block 302), and/or whether any finger in the cropped image is a fake finger. The results of such determinations may be displayed as user alerts or feedbacks on the display screen 214. In particular embodiments, the processing at block 306 may include reducing the noise in the cropped image, correcting curvature-based distortions in each imaged finger based on the 3D depth map of the finger, scaling the cropped image to a substantially 500 dpi resolution, transforming the contactless fingerprint image into an "equivalent" contact-based fingerprint image, computing a finger-specific National Institute of Standards and Technology Fingerprint Image Quality 2 (NIST NFIQ2) score for each imaged finger in the contact-based fingerprint image, and/or displaying the processed contactless image with or without the finger-specific NIST NFIQ2 score on the display screen 214 of the UE 202.

Subsequently, at block 307, the computing system may generate—using the fourth NN module 105 (FIG. 1)—a finger-specific fingerprint template for each finger in the processed contactless image based on the processed contactless finger image (at block 306). Each finger-specific fingerprint template generated by the fourth NN module 105 is a feature vector of identical dimension. In other words, all fingerprint templates as per particular embodiments of the present disclosure have the same, fixed length that does not depend on the number of finger-specific minutiae points. At block 308, the computing system may store each finger-specific fingerprint template (generated at block 307) in its memory (such as the memory 212) for subsequent use in fingerprint matching. For example, in certain embodiments, the computing system (here, the UE 202) may locally compare two fingerprint templates stored in its memory 212 using a mathematical function to generate a comparison score, and determine that the compared fingerprint templates match with each other when the comparison score is above a pre-defined threshold. In other embodiments, the computing system may transmit the fingerprint template stored at block 308 to a remote server (such as the host system 602 in FIG. 6) for matching against other fingerprint templates, as discussed later.

In particular embodiments, the computing system (such as the UE 202) also may create a finger-specific International Organization for Standardization 19794-2 (ISO 19794-2) compliant Minutiae Interoperability Exchange (MINEX) template using the processed contactless image (at block 306), and store each finger-specific MINEX template in the memory 212. In some embodiments, the computing system also may generate one or more compressed images from the processed contactless image, and store the compressed images in the memory 212 for future use. The compressed images may be in a number of different image formats such as, for example, an ISO 19794-4 compliant Wavelet Scalar Quantization (WSQ) image format, a bitmap (BMP) image format, and a Portable Network Graphic (PNG) image format.

The flowchart 300 provides an outline of the manner in which functionality of the ACF application 100 may be implemented as per teachings of the present disclosure to allow AI-based contactless fingerprinting of a user in real-time and also to get visual feedbacks during various stages of the fingerprinting process. The AI-based approach to fingerprint capture, liveness detection, and matching may significantly enhance the quality, accuracy, and reliability of the entire fingerprinting process. The functionality of the ACF application 100 may effectively "convert" the UE 202 as a robust, versatile, and mobile fingerprint scanner with wide-ranging applications in the field.

Figure 4B:
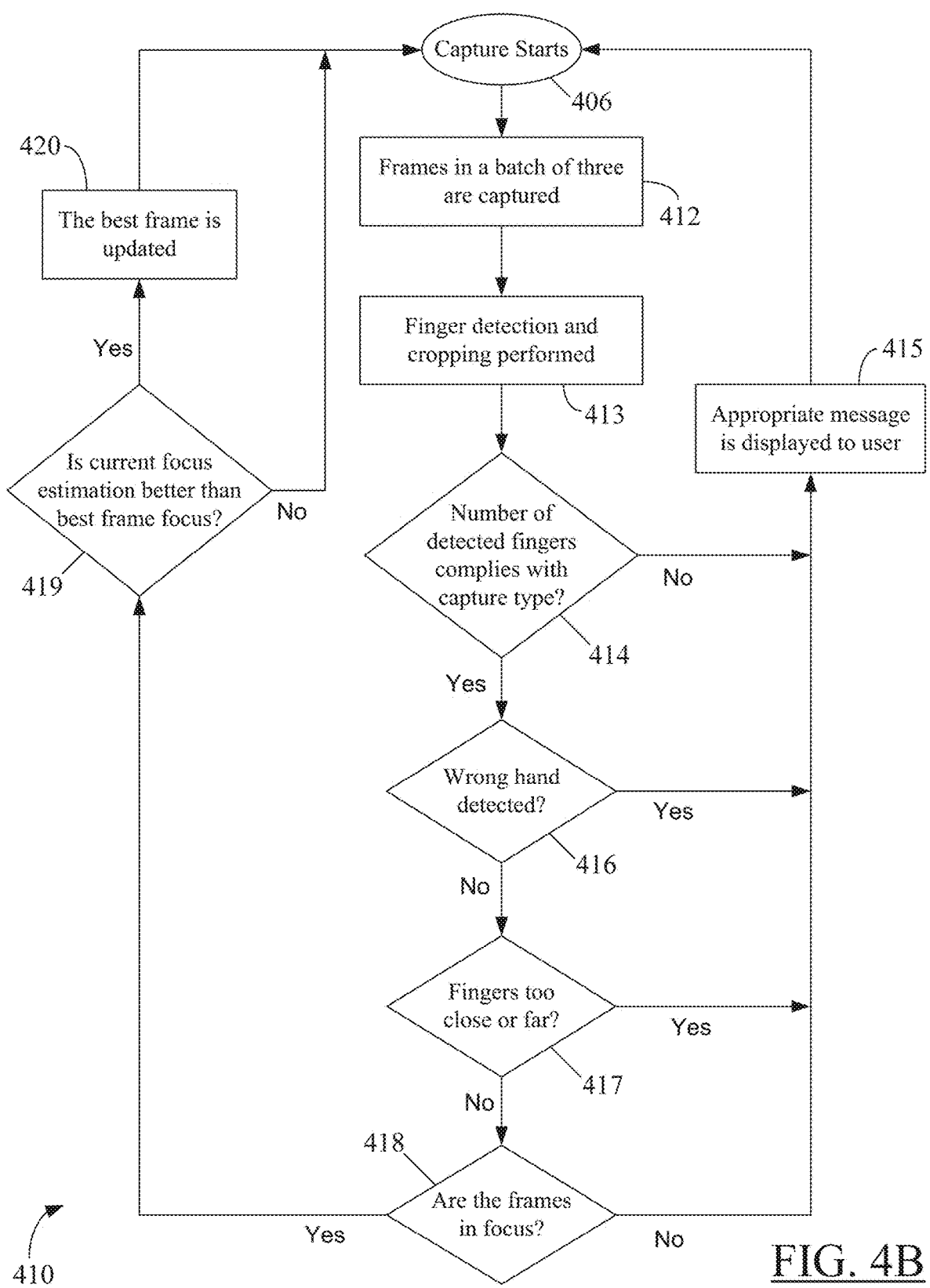

FIGS. 4A-4B depict exemplary flowcharts 400, 410 providing details of various tasks performed by the ACF application 100 to facilitate contactless fingerprinting as per particular embodiments of the present disclosure. In contrast to the high-level overview of the functionality of the ACF application 100 in FIG. 3, FIGS. 4A-4B provide significant technical details of image processing and analysis performed by the ACF application 100 as per teachings of the present disclosure. As noted before, the process in the flowcharts 400, 410 in FIGS. 4A-4B is described with reference to the system 200 in FIG. 2. Thus, in certain embodiments, the computing system performing the tasks in the flowcharts 400, 410 in FIGS. 4A-4B may be the UE 202. For ease of explanation, the flowcharts in FIGS. 4A-4B are discussed in conjunction with FIGS. 5A-5K, which show exemplary screenshots of various displays and alerts that may be provided to a user (such as the user 204 in FIG. 2) in real-time by the ACF application 100 during contactless fingerprinting as per certain embodiments of the present disclosure. The screenshots may be generated by the ACF application 100 and displayed on the UI 214 of the mobile device 202.

Referring now to the flowchart 400 in FIG. 4A, at block 402, the user or the operator runs the ACF application 100 from the UE's display screen or UI 214 to begin the fingerprinting process. It is understood that the ACF application 100 is already installed in a camera-integrated device—such as the UE 202—as an executable application. As mentioned before, the ACF application 100 may have been pre-packaged with the handset 202 or may have been downloaded by a user/operator into the memory 212, for example, from a website (or portal) hosted by a third party. Once run, the application start window may appear on the UI 214. FIG. 5A provides an exemplary screenshot 500 of the application start window in which a "left slap" capture type is selected by the user. In the field 502 in the start window 500, the user/operator may be required to enter the name (or other identifying information or ID) of the person being fingerprinted, as noted at block 403 in FIG. 4A. The user also may select a capture type from a dropdown menu (not shown) on the start window. In particular embodiments, the following types of capture may be offered: left slap (left four fingers), right slap (right four fingers), left thumb, right thumb, both thumbs, left index finger, right index finger, left index and left middle fingers, and right index and right middle fingers. The "left slap" selection of FIG. 5A is indicated by reference numeral "504." The user also may be provided a number of fingerprinting choices, which are collectively identified by the reference numeral "506" in FIG. 5A and discussed later in more detail. Briefly, such choices may include, for example, the use of liveness detector (to identify fake or non-human fingers), the display of finger ellipses, the creation of fixed-length fingerprint templates (for fingerprint matching), the orientation check of finger(s) being imaged, the creation of an SDK (Software Development Kit) log of the fingerprinting operation for storage in the memory 212 as a record of raw data, and the selection of the detector threshold for the camera's image sensor. After desired selections are made, the user may press the camera icon 508 as a "Capture" button to start the real-time capture of the optical images of the selected finger(s).

Prior to initiating the image capture, the ACF app 100 may adjust the camera 216 for optimal fingerprint capture in a contactless manner (block 404). For example, the ACF application 100 may modify certain camera settings and record those settings to ensure that the integrated camera 216 can properly focus on the selected fingerprints and does not suffer from significant distortion. This ensures that the capture maintains similarity across different devices. In particular embodiments, the camera's zoom ratio may be modified and the flash may be turned on (if available). Additionally, the camera sensor's height and width along with the focal length may be recorded for better processing of the fingerprints in later stages.

In certain embodiments, the main camera 216 may be used to capture the finger images after which they are converted into fingerprint images. Depending on the main camera settings, the fingerprint capture quality can vary as follows:

(i) If the capture is carried out in a preview mode, the pixel resolution may be 1920×1080. If the camera 216 does not support this resolution, then the papillary pattern may be less distinguishable and blurrier when it is digitally magnified during subsequent processing to bring the fingerprint resolution to 500 dpi. For example, if the resolution is lower than 190×1080, the papillary pattern may be less distinguishable and more blurry when digitally magnified. If the resolution is higher than 190×1080, the resolution is sufficient to illustrate the digitally magnified papillary pattern.

(ii) If the camera 216 does not provide an optical 2× zoom, then the papillary pattern will be less distinguishable and blurrier.

(iii) If the camera 216 does not support zoom at all, then the fingers may have to be held closer to the camera during image capture, which could negatively affect the camera's ability to focus well.

(iv) The noisier the camera matrix, the less distinguishable the papillary lines.

(v) The performance of the processor 210 and the speed of the camera 216 (in terms of number of frames per second) in the preview mode may affect the quality of the noise filter used for the sequence of three successive frames (discussed later with reference to FIG. 4B).

As mentioned before and discussed in more detail later, in particular embodiments, the UE's camera unit 216 may include a LiDAR or ToF sensor (not shown) that can be used to perform distance measurements to build a 3D depth map of a finger, which can be used to bring the fingerprint resolution to substantially 500 dpi and eliminate the fingerprint distortion caused by the curvature of the finger shape. However, a ToF or LiDAR sensor also may affect the quality of captured fingerprints as follows: (i) The smaller the distance between the camera and the fingers, the greater the error in determining the distance. (ii) If the main (optical) camera 216 does not support zoom at all, then the fingers may have to be held closer to the camera during image capture, which could increase the error in determining the fingerprint's scale. (iii) The recommended minimum distance between the camera and the fingers may have to be 10 cm.

Referring back to FIG. 4A, when the user presses the camera icon 508, the real-time image capture may start (block 406). A fingerprint capture screen may now appear on the UI 214 for the user to observe the real-time capture. The screenshot 510 in FIG. 5B shows an exemplary capture screen/window when the capture type is "right index and middle fingers." It is understood that any surface in the background should be as far away as possible behind the subject's/user's hand. Furthermore, it may be desirable to avoid a location with a direct light source (solar or artificial) into the camera 216. It may be recommended to choose a location with a dark, solid color, and non-textured background for good quality fingerprints. The user may need to place the selected fingers of the appropriate hand in front of the camera 216 in a contactless manner, but within the borders 512 that may be displayed on the screen 214 to assist the user in proper finger placement. The user also may need to make sure that the hand is as close to the camera as possible and keep the fingertips fully within the borders 512.

As illustrated by the exemplary arrows 514, 515, the left hand should be positioned from the left side whereas the right hand should be positioned from the right side of the UE's 202 display screen facing the user 204. In particular embodiments, the arrows 514, 515 are neither displayed nor part of the capture screen 510. Furthermore, as discussed later, only the appropriate fingers should be present in the capture window 510.

In FIG. 4A, the blocks 408 and 410 are essentially identical; they both refer to the tasks in the flowchart 410 in FIG. 4B that provides a detailed understanding of how the captured frames are processed by the ACF application 100 and the most "optimal" frame is selected. However, merely for the sake of explanation, block 408 is separately illustrated to emphasize that as image frames are being analyzed, a "best frame" is maintained (and regularly updated) for further processing. Details of what constitutes a "best frame" are provided below with reference to discussion of FIG. 4B.

The circled block 410 refers to the flowchart in FIG. 4B. Hence, the process flow in the flowchart 400 includes the tasks in the flowchart 410 in FIG. 4B. In particular embodiments, the ACF application 100 may perform the tasks in the flowchart 410 in FIG. 4B prior to continuing the remaining tasks in the flowchart 400 in FIG. 4A.

Referring now to FIG. 4B, once the image capture starts at the initial block 406 (which is identical to that shown in FIG. 4A), the ACF application 100 may utilize the camera 216 to capture the optical image frames in a batch of three frames, as noted at block 412. Such grouping may be desirable because the fingers presented by the user for capture may tend to move and, hence, may not be quite stable. Thus, a batch of three consecutive image frames may be captured using the camera 216 so that the added temporal factor may minimize the distortion caused by the fingers' movement. It is noted that a typical smartphone or mobile camera may capture 30 or 60 frames per second for normal light conditions or in the absence of low-light compensation.

At block 413, the ACF application 100 may perform finger detection and cropping. It is observed that finger detection arguably may be the most important part of fingerprint capture technology. In the present disclosure, the first NN module 102 (FIG. 1) based ML model may implement this aspect using a deep neural network consisting of convolutional layers. It is known that neural networks are universal function approximators that are loosely modeled after the human brain. In addition to neural networks reliably finding patterns in the input data for a decision, convolutional layers help impart spatial knowledge to the neural network. This may be facilitated with the use of convolution with n×n kernels, where "n" is the kernel size.

In particular embodiments, the MobileNetV1 architecture was used for the first NN module 102. This architecture is described in detail in Howard, Andrew G., et al., "MobileNets: Efficient Convolutional Neural Networks for Mobile Vision Applications," arXiv® pre-print document no. 1704.04861, published on Apr. 17, 2017 and available at https://arxiv.org/pdf/1704.04861.pdf, the disclosure of which is incorporated herein by reference in its entirety. It is noted that, as opposed to regular convolution, the MobileNetV1 architecture has the added advantage of using depthwise separable convolutions to significantly reduce the number of parameters in the neural network. For example, with 28 layers, the MobileNetV1 only has 13 million parameters. Thus, in the MobileNetV1 based first NN module 102, the training dataset consisted of 169,450 fingerprint images, which were subjected to data augmentation techniques such as random motion and random scaling. The dimensions of each training image were 256 pixels in height and 256 pixels in width. In particular embodiments of the present disclosure, the input to the (trained) first NN module 102 is the frames of a captured RGB color image (at block 412 in FIG. 4B) with single or multiple fingers (as per user-selected capture type), and the outputs of the neural network of the first NN module 102 may be finger-specific landmark points for each finger. The spatial orientation of these visual landmarks may help compute the finger's size as well as its direction. In particular embodiments, the trained network of the first NN module 102 is further optimized by converting it to an NCNN model discussed at https://github.com/Tencent/ncnn, the disclosure of which is incorporated herein by reference in its entirety. It is understood that NCNN is a high-performance neural network inference computing framework optimized for mobile platforms. Deep learning algorithm models can be easily deployed on the mobile platform using NCNN. Furthermore, the NCNN framework may help combine several NN layers and decrease the number of operations in order to reduce the resource consumption of the network. The optimizations afforded by the combination of the MobileNetV1 architecture and NCNN may result in a trained ML model (of the first NN module 102) that is able to run in a handheld device and to accurately process captured image frames in real-time for a seamless capture.

Figure 5E:
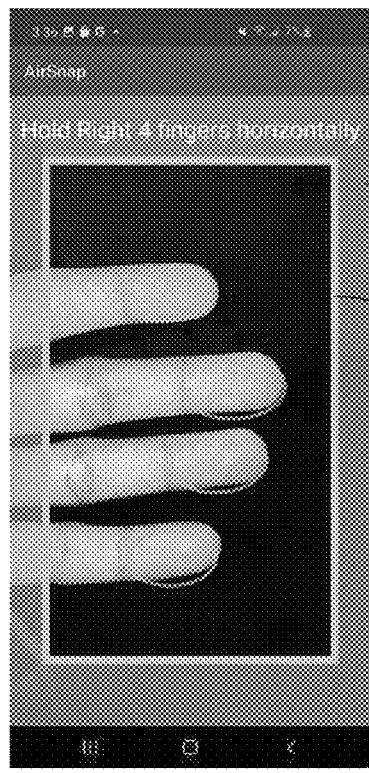
Figure 5F:
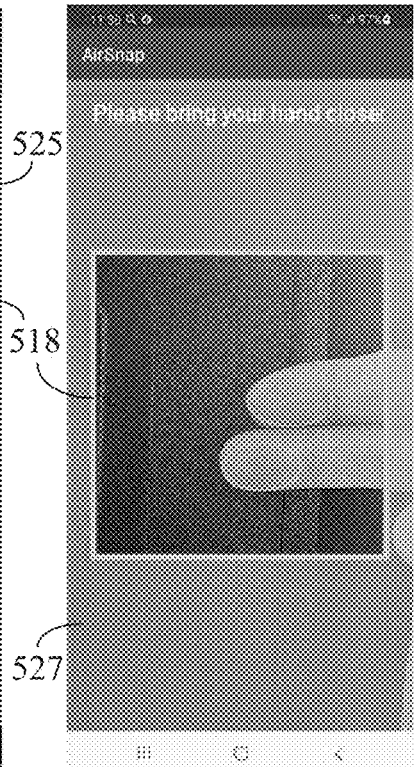
Figure 5G:
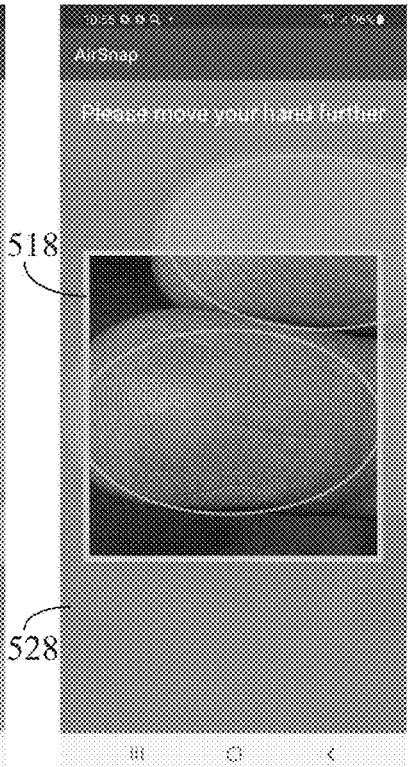
Figure 5H:
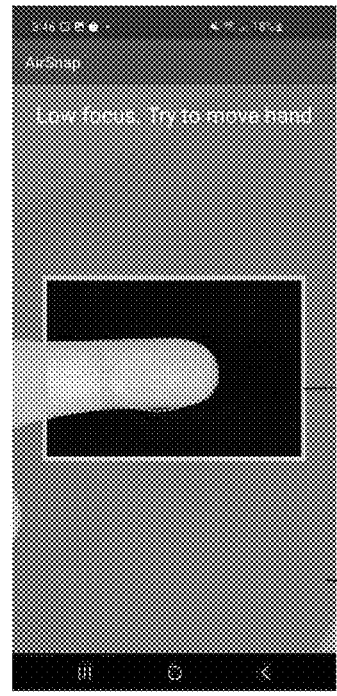
Figure 5I:
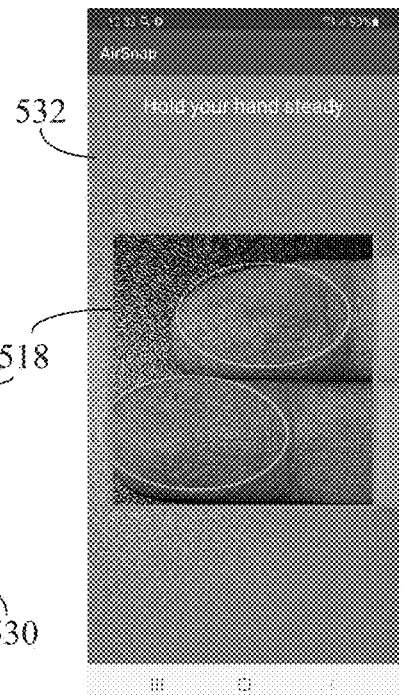
Figure 5J:
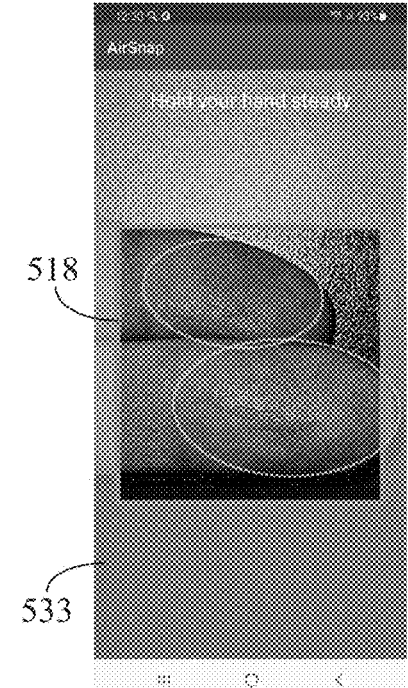

Once the visual landmarks for each finger are extracted using the first NN module 102 based ML model, they are used to output a bounding box for each finger and crop the image. An exemplary bounding box 518 is a component of the capture screen. Each finger has its own bounding box, allowing each finger to be displayed in a distinct bouding box. It is noted that, in particular embodiments, the size of the bounding box 518 may vary depending on the number, size, and direction of the captured fingers. In particular embodiments, the detected landmarks for each finger also may be used to extract an ellipse around the finger. The finger-specific ellipses may be displayed around each finger in the cropped image based on the detected size and direction of the finger to thereby visually identify the finger to provide a continuous feedback to the user during image capture and also to aid the user by making the image capture process easy. The finger-specific ellipses 520, 521 are also shown in FIG. 5C. Similar ellipses are also shown in FIGS. 5E through 5J, but not individually identified with reference numerals merely for simplicity of the drawings. It is noted that, in certain embodiments, the operations at block 413 may analyze only the middle frame out of the three captured frames in the batch (at block 412) to avoid redundant processing.

At the decision block 414, the ACF application 100 may determine if the number of detected fingers in the cropped image complies with the user-selected capture type. In one embodiment, the number of visual landmarks extracted by the finger detector (at block 413) may be used to verify if the number of fingers detected in the analyzed frame equals the number of fingers associated with the capture type selected by the user. If not, an appropriate feedback may be given to the user as noted at block 415. For example, if the number of detected fingers is less or more than the selected capture type, a corresponding message or alert may be displayed on the screen 214 of the UE 202. In the exemplary screenshot 523 in FIG. 5D, an error message is shown alerting the user that more than two fingers are detected when the selected capture type only had two fingers.

At decision block 416, for each finger, the ACF application 100 may use the relative orientation of the detected finger-specific landmarks (at block 413) to extract the finger's angle. These angles of each detected finger (in the cropped image) may be then verified with the selected capture type to ensure that the user has not captured a wrong hand (for example, left instead of right). If a wrong hand is detected, an appropriate feedback may be given to the user as noted at block 415. This feedback may be in the form of an alert displayed on the screen 214 of the UE 202. For example, in the exemplary screenshot 525 in FIG. 5E, an error message is shown where the selected capture type was a right slap, but the user is presenting a left slap.

At decision block 417, the ACF application 100 may compare the spatial distance between the detected landmarks (at block 413) of each finger with a statistically-determined acceptable range of values to verify if the user has positioned the fingers too close or too far from the camera 216. If the comparison with the pre-determined range of values indicates an unacceptable finger placement (either too close or too far), an appropriate feedback may be given to the user as noted at block 415. As before, the feedback may be in the form of an alert message displayed on the screen 214 of the UE 202. For example, in the exemplary screenshot 527 in FIG. 5F, an error message is shown when the detected fingers are found to be too far from the camera 216. The message instructs the user to bring his/her hand closer to the camera 216. On the other hand, in the exemplary screenshot 528 in FIG. 5G, the displayed feedback message instructs the user to move his/her hand further away from the camera 216 because the position of the detected fingers is too close to the camera 216.

At decision block 418, the ACF application 100 may appropriately scale and analyze each cropped finger (in the cropped image at block 413) for focus using traditional image processing techniques. The extracted focus score may be then compared with a pre-defined statistically-determined threshold. If the focus score is below the threshold, an appropriate feedback may be given to the user as noted at block 415. As before, the feedback may be in the form of a visual alert on the screen 214 of the UE 202. For example, in the exemplary screenshot 530 in FIG. 5H, the displayed message alerts the user that the captured finger is in low focus and, hence, the user should try to move the hand to improve the focus.

As discussed before with reference to block 408 in FIG. 4A, the ACF application 100 continuously analyzes the captured image frames and regularly (in real-time) updates the "best frame." If the extracted focus score (at block 418) of the frame currently being processed is better than the focus score of the previously-established best frame (at block 408), the ACF application 100 may update its selection of the best frame and treat the current frame as the "best frame", as indicated at blocks 419-420 in FIG. 4B. The ACF application 100 will then further process and analyze this new "best frame" as shown in FIGS. 4A-4B and discussed below.

It is noted that, at block 415, positive and negative feedback may be displayed to the user in real-time during image capture. In particular embodiments, different colors may be employed for the borders of the boxes 512, 518 to facilitate additional visual feedback to the user. For example, if no fingers are detected or if the number of detected fingers does not match with the selected capture type, the borders of the relevant box 512 or 518 may be displayed in red color. Thus, initially, the borders of the capture box 512 in FIG. 5B may be of red color. Similarly, the borders of the box 518 in FIG. 5D also may be of red color. On the other hand, if the focus is inadequate (detected fingers too close or too far from the camera) or if the wrong hand is detected, the borders of the box 518 may be displayed in yellow color. Thus, the borders of the boxes 518 in FIGS. 5E through 5H may be displayed in yellow color. When the alert-causing condition is rectified by the user (for example, by moving the hand to bring the fingers in focus), the yellow border may change to green color. Thus, green color may be used for the border of the box 518 to indicate that the computed focus is within an acceptable range and a "best frame" will be selected for further processing. The box 518 with the green-colored border may be accompanied by a positive message on the screen 214 of the UE 202. The positive message may read "Hold your hand steady", as illustrated in the exemplary screenshot 532 in FIG. 5I (for "right index and middle" capture type) and in the exemplary screenshot 533 in FIG. 5J (for "left index and middle" capture type). The borders of the boxes 518 in FIGS. 5I and 5J may be displayed in green color as discussed here.

Referring now to FIG. 4A, the blocks 422 and 423 relate to the conditions when the ACF application 100 stops the image capture operation at block 424. In particular embodiments, the image capture may stop only on two conditions: (i) if the most-recent "best frame" did not update in the last one (1) second, as indicated at the decision block 422, and (ii) if ten (10) seconds have passed since the first "best frame", as indicated at the decision block 423. In FIG. 4A, the tasks at blocks 425 through 435 relate to further processing of the cropped image available when the capture stops at block 424. In particular embodiments, such additional processing may generate a processed contactless image suitable for extracting finger-specific fingerprint templates for subsequent matching of fingerprints, as discussed below. It is noted that, in certain embodiments, the ACF application 100 may not perform one or more of the post-capture processing tasks 425-435 depending on the specific implementation.

At block 425, the ACF application 100 may check if the fingers presented in the cropped image are reversed with the nails being visible instead of fingerprint patterns. In particular embodiments, the second NN module 103 (FIG. 1) may be deployed to check if fingers are reversed or not. The second NN module 103 may be a trained neural network with the MCUNet architecture. This architecture is described in detail in Lin, Ji, et al., "MCUNet: Tiny Deep Learning on IoT Devices," Advances in Neural Information Processing Systems 33: 11711-11722 (2020), the disclosure of which is incorporated herein by reference in its entirety. The MCUNet network involves a two-stage neural architecture that modifies and optimizes the search space based on the resource constraints, and then optimizes the neural architecture in the updated search space. As a result, MCUNet only has around 1.2 million parameters. In particular embodiments, for the second NN module 103, the MCUNet network was trained on 128×128 pixel dimensional 10,000 grayscale finger images with either the finger-tip or the nail side being projected. Thus, at run time, the input to the trained MCUNet based second NN module 103 may be a (cropped) finger image and the output may be a score depicting the probability of the finger being reversed—that is, the nail side being shown. The trained NN module 103 then may compare the score with a statistically pre-determined threshold to output a boolean decision stating if the finger is reversed or not. In one embodiment, when the score exceeds the threshold, a "true" decision may be displayed to the user, alerting the user that a fingernail is visible. On the other hand, when the score is below the threshold, a "false" decision may be displayed to indicate that there is no finger reversal.

At block 426, the ACF application 100 may check if the correct thumb is captured for the user-selected capture type. As part of this task, the ACF application 100 initially may confirm that the user has selected to capture only a thumb in the optical image. For capture types that only require the thumbs to be captured, it is imperative to detect if the thumb presented to the camera 216 is from the right hand or the left. In particular embodiments, such detection may be performed using the third NN module 104 (FIG. 1). The third NN module 104 may be a trained neural network with the above-mentioned MCUNet architecture. In case of the third NN module 104, the MCUNet network was trained on 128×128 pixel dimensional 15,000 grayscale thumb images. Thus, at run time, the input to the trained MCUNet based third NN module 104 may be a thumb image (in the cropped image at block 413) and the output may be a score from "0" to "1," where a value close to "0" means a left thumb whereas a value close to "1" signifies a right thumb. In other words, the score may represent a probability of the thumb being of a left hand or a right hand. In one embodiment, the trained NN module 104 then may compare the score with a statistically determined threshold to output a final decision stating if the thumb is of the left or the right hand. The ACF application 100 may display an alert on the UI 214 when the score signifies detection of the thumb of an incorrect hand. For example, the user has selected to capture the thumb of the left hand and the decision indicates that the captured thumb is of the user's right hand, then the displayed alert may convey that an incorrect thumb is detected. In one embodiment, the alert may appear in the form of a disappearing text on the screen 214 informing the user that the captured thumb is of the wrong hand. At this point, in some embodiments, the ACF application 100 may prevent any further processing of the captured image till the correct thumb is recaptured.

At block 427, the ACF application 100 may perform fingerprint liveness detection to prevent malicious users from impersonating someone's identity using spoof fingerprints. As part of image processing for liveness detection, the ACF application 100 may analyze the cropped fingerprint image (generated at block 413 in FIG. 4B) and check it for those artifacts that are typically only found in spoof fingerprints. In particular embodiments, image processing may be used to analyze the artifacts such as the skin color of each finger, possible moire patterns, and image noise. The ACF application 100 then may compute a liveness score based on the artifact-related information. A statistically pre-determined threshold then may be used to make a decision if the fingerprint image is live (real finger) or spoof (fake finger). For example, if the liveness score is below the pre-defined threshold, the decision of the ACF application 100 may have the value of "0" indicating that no finger in the cropped image is a fake finger. On the other hand, if the liveness score is above the threshold, the decision may have the value of "1" indicating that there is a fake finger in the cropped image. In certain embodiments, the decision may be displayed to the user on the UI 214 of the UE 202.

At block 428, the ACF application 100 may perform noise filtering of the cropped image for optimal frame generation. Since frames were captured in a batch of three (as noted at block 412 in FIG. 4B), all the processing performed at this point was on the middle frame. However, at block 428, the ACF application 100 takes into account all three frames and processes them to output a single noise-reduced transformed frame (fingerprint image). In particular embodiments, as part of the processing at block 428, the cropped fingerprint images from all the three frames may be geometrically transformed (warped) and then united using a non-linear digital filter to remove redundant noise. Thus, for ease of discussion, in particular embodiments, the term "cropped image" in the context of blocks 429-435 in FIG. 4A may refer to such noise-reduced united image. In other embodiments, the term "cropped image" in the context of some of these blocks may refer to the cropped image at block 413 in FIG. 4B.

At block 429, the ACF application 100 may correct curvature-based distortions in each imaged finger in the (noise-reduced) cropped image based on the 3D depth map of the imaged finger. It is observed that fingerprints captured using contactless approaches may suffer from spatial distortion because the centre part of a finger is closer to the camera than the edges due to the curvature of the finger. Thus, it is desirable to correct this distortion to minimize the domain gap between contactless and contact-based fingerprints. If the UE's camera unit 216 includes a ToF or LiDAR sensor, the ACF application 100 may use the available sensor to obtain a 3D depth map of each finger being imaged. This depth map may be filtered and then used to flatten the distorted fingerprint image using transformations.

At block 430, the ACF application 100 may scale the (noise-reduced) cropped image to a substantially 500 dpi resolution using depth information. It is observed that the industry-standard resolution for fingerprint images is 500 dpi (dots per inch) to ensure that all fingerprint images— whether obtained in a contact-based manner or contactless manner—have the same scale. Thus, for effectively converting the captured contactless fingerprint image to a contact-based fingerprint image, it is imperative to scale the captured image to 500 dpi. As mentioned before, if the mobile device 202 has a ToF or LiDAR sensor, the ACF application 100 may use the available sensor to obtain a 3D depth map of the finger capture. This depth map, along with the camera sensor information such as focal length and zoom ratio, then may be used by the ACF application 100 to scale the captured fingerprint image to a resolution of 500 dpi±1%. In case the mobile device 202 is not a ToF- or LiDAR-equipped device, the ACF application 100 still may scale the images to 500 dpi±10% using domain knowledge and image processing. Such scaling may be facilitated by statistical information about finger size and ridge distance along with the finger detector's output.

At block 431, the ACF application 100 may use image processing to convert the (noise-reduced) cropped fingerprint image—obtained in the contactless manner—to resemble a contact-based fingerprint image. In particular embodiments, such image processing may include the use of image inversion, local normalization, and smoothing.

At block 432, the ACF application 100 may compute a finger-specific National Institute of Standards and Technology Fingerprint Image Quality 2 (NIST NFIQ2) score for each imaged finger in the (noise-reduced) cropped image. It is noted that fingerprint quality is an important aspect of a fingerprint image because it shows if the capture was effective or not based on the overall quality of the captured fingerprint. In particular embodiments, the ACF application 100 may take into account the widely-used NIST NFIQ2 fingerprint quality scores along with fingerprint ridge quality to output a quality score in the range of [0-100], where the score of "0" indicates a fingerprint image with the least quality while the score of "100" indicates the highest quality. In certain embodiments, the ACF application 100 may use the scaled image with 500 dpi resolution (at block 430) or the converted contact-based version (at block 431) to determine the fingerprint quality score. It is noted that the NIST NFIQ2 scores allow for the standardization needed to support a worldwide deployment of fingerprint sensors with universally interpretable image qualities. NFIQ2 quality scores are formally standardized as part of International Organization for Standardization/International Electrotechnical Commission 29794-4 (ISO/IEC 29794-4) standard. Additional discussion of the NIST NFIQ2 scores is provided at https://github.com/usnistgov/NFIQ2, the disclosure of which is incorporated herein by reference in its entirety.

At block 433, the ACF application 100 may create a finger-specific Minutiae Interoperability Exchange (MINEX) template using the processed contactless image and store each finger-specific MINEX template, for example, in the memory 212 of the UE 202 for exchange. Each MINEX template may comply with the International Committee for Information Technology Standards 378 (IN-CITS 378) standard and the ISO/IEC 19794-2 standard. It is noted that, in some embodiments, the processed version of the (noise-reduced) cropped image at block 430 or block 431 in FIG. 4A may be considered the processed contactless image to be used for creating the MINEX templates, which facilitate the interchange of fingerprint (minutiae) information/data amongst third-party fingerprint matchers. Additional discussion about MINEX templates is provided at https://www.nist.gov/programs-projects/minutiae-interoperability-exchange-minex-overview, the disclosure of which is incorporated herein by reference in its entirety. In certain embodiments, the MINEX templates may be saved in a data storage (not shown) external to the mobile device 202 or uploaded to a remote server (such as the remote host 602 in FIG. 6, discussed later) as per needs.

At block 434, the ACF application 100 may generate a compressed image from the processed contactless image and save the compressed image. In one embodiment, the captured and processed images may be compressed into the ISO 19794-4 compliant Wavelet Scalar Quantization (WSQ) image format, as well as into the bitmap (BMP) image format and the Portable Network Graphic (PNG) image format. In one embodiment, the BMP and PNG images may have a resolution of 500 pixels per inch (ppi)+5 ppi. Thus, the processed contactless image may be converted to WSQ, BMP, and/or PNG type images and saved in the device's internal memory 212, or a data storage (not shown) external to the mobile device 202, or uploaded to a remote server (such as the remote host 602 in FIG. 6, discussed later) as per needs.

It is noted that, in particular embodiments, the ACF application 100 may use the programming functions in the Open Source Computer Vision (OpenCV) library to carry out some or all of the traditional image processing tasks associated with blocks 427 through 434.

Figure 5K:
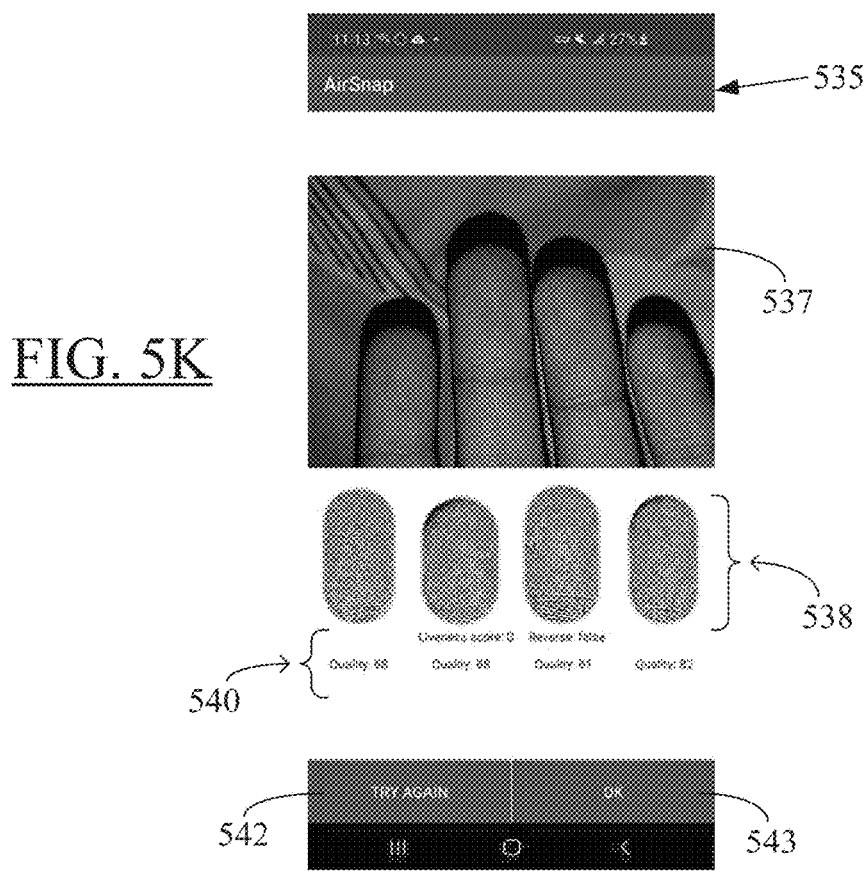

At block 435, the ACF application 100 may display the processed contactless image of the captured fingerprint(s) on the display screen 214 of the mobile device 202. Additionally, as part of this final stage of the capture process, the ACF application 100 also may display the following metrics on the display screen 214 along with the processed contactless image: (i) the boolean finger reverse value (generated at block 425), (ii) the fingerprint liveness score (generated at block 427), and (iii) the finger-specific NIST NFIQ2 fingerprint quality score (generated at block 432). The exemplary screenshot 535 in FIG. 5K illustrates the contents of the display mentioned at block 435. The screenshot 535 is shown to include an example of a processed contactless image 537 along with fingerprints of individual fingers captured in the contactless image as well as relevant scores from the processing blocks 425, 427, and 432 mentioned above. The individual fingerprints are collectively identified using the reference numeral "538" and the scores are collectively identified using the reference numeral "540." Thus, in particular embodiments, the processed image may be segmented into multiple images each of which may contain a single fingerprint.

The block 436 indicates that, after the fingerprint and relevant metrics are displayed on the screen 214 of the device 202, the user/operator has the option to repeat the entire capture process again or to exit to the application's starting screen—like the screen 500 in FIG. 5A. For example, the "Try Again" button 542 in the screenshot 535 in FIG. 5K allows the user/operator to attempt a second capture of the same fingers in the event of a bad quality of the displayed image 537. On the other hand, if the user/operator selects the "OK" button 543, the displayed image 537 and corresponding fingerprints 538 and scores 540 may be saved—for example, in the device's internal memory 212—and the main screen of the ACF application 100 may appear on the UI 214 to allow the user/operator to initiate the whole capture process again starting with block 403 in FIG. 4A.

In particular embodiments, after the conclusion of the image capture and processing tasks of FIGS. 4A-4B, the ACF application 100 may perform AI-based fingerprint matching locally on the device 202 using the fourth NN module 105 (FIG. 1). The remote matching aspect is discussed later with reference to FIGS. 6-7. It is observed that fingerprint matching may be the final and the most crucial step in a fingerprint recognition system. Typically, a fingerprint matcher takes as input fingerprint data, usually in the form of a fingerprint image, and outputs a corresponding template. Two such biometric templates can then be compared using an algorithm to determine if they have the same identity or not. Traditional fingerprint matchers are majorly conditional on the minutiae points in a fingerprint, their relative positions, and ridges between them. Because the number of minutiae points in a fingerprint varies, the extracted template size in a traditional matcher also varies a lot. The variable size of the templates combined with a complex matching strategy may make it difficult for any integrator to optimize the storage and matching without sacrificing accuracy.

In contrast to the traditional fingerprint matching techniques, the neural network-based feature/template extraction approach in the fourth NN module 105 not only allows the neural network to decide on which are the best features to achieve high accuracy, but also yields a constant size template for each fingerprint (irrespective of the number of minutiae points) that can be compared easily using a mathematical function, such as the one-step cosine distance calculation, discussed below. Thus, generally, the ACF application 100 may compare two (fixed-length) fingerprint templates using the mathematical function (such as the cosine similarity function) to generate a comparison score (such as the cosine similarity score), and determine that the compared fingerprint templates match with each other when the comparison score is above a pre-defined threshold, as discussed in more detail below.

In particular embodiments, the fingerprint template extractor in the fourth NN module 105 may be a deep neural network with the ResNeSt-101 architecture. This architecture utilizes channel-wise attention on different network branches and leverages their success in capturing crossfeature interactions. This enables the network to learn diverse representations. Because this results in simplified and unified blocks, the number of parameters are only 101 million. The ResNeSt-101 architecture is described in detail in Zhang, Hang, et al., "ResNeSst: Split-attention Networks," Proceedings of the IEEE/CVF Conference on Computer Vision and Pattern Recognition (2022), the disclosure of which is incorporated herein by reference in its entirety.

In particular embodiments, for the fourth NN module 105, the ResNeSt network was trained on 120,000 cropped fingerprint images having only one finger in the frame. The images were grayscale images (1 channel) and had dimensions of 256 pixels in height and 256 pixels in width. The training data was subjected to random rotation and random horizontal and vertical shifts for robust training. Thus, at run time, the input to the trained ResNeSt network based fourth NN module 105 may be a finger-specific fingerprint image (such as, for example, one of the fingerprint images 538 shown in FIG. 5K) and the output may be a fixed-length feature vector that serves as the biometric template of the corresponding finger. In one embodiment, the fixed length feature vector may be a 256-dimensional feature vector. As noted before, in some embodiments, each finger-specific feature vector/template may be of the same length or identical dimension such as, for example, 256-dimensional template. Thus, the fourth NN module 105 may generate a finger-specific fingerprint template regardless of the number of finger-specific minutiae points in the processed contactless image. In certain embodiments, all such fingerprint templates may be stored locally in the UE's memory 212. It is noted here that, in particular embodiments, the fixed-length fingerprint templates generated by the fourth NN module 105 may be in addition to the MINEX templates discussed before with reference to block 433 in FIG. 4A.

The ACF application 100 then may compare two x-dimensional biometric templates using a mathematical function, such as the cosine similarity function. The cosine similarity function may take in two (fixed-length) fingerprint templates A and B and compute a cosine similarity score given by the following equation:

$$cosineSimilarity(A, B) = \frac{A \times B}{\|A\| \times \|B\|} = \frac{\sum_{i=1}^{x} A_i \times B_i}{\sqrt{\sum_{i=1}^{x} A_i^2} \times \sqrt{\sum_{i=1}^{x} B_i^2}}$$

The cosine similarity score between two templates may be in the range of [−1,+1]. In particular embodiments, a score of "−1" may imply that the two templates are very dissimilar— i.e., the templates are of two different fingers. On the other hand, a score of "+1" may imply that the two templates are very similar—i.e., the templates are of the same finger. The ACF application 100 may use a statistically pre-determined threshold to make a matching decision. For example, if the score is below the threshold, the ACF application 100 may classify the template pair to be of different fingers, and if the score is above the threshold, the template pair may be classified to be of the same finger.

As mentioned before, the fixed-length fingerprint template extractor and mathematical matcher can be implemented locally on the same device 202 or on a remote server (such as the host system 602 in FIG. 6, discussed later). As also mentioned before, the processed contactless image and individual fingerprints/templates may be stored in the device memory 212. Furthermore, in some embodiments, the memory 212 also may include a database of fingerprints (or corresponding fixed-length fingerprint templates) of various human subjects such as, for example, criminals or suspicious actors. Thus, in case of local (on-device) verification and identification, the on-device fingerprint matcher may be used by the ACF application 100 to compare a newly-captured fingerprint image/template with the reference images/templates stored in the device memory 212 for offline verification and identification. If the identity of a subject is known or if the subject's fingerprint(s) are already enrolled in the system, the verification task may include 1-to-1 matching of the newly-captured fingerprint template of a specific finger with a previously-captured fingerprint template of the same finger of the same subject to verify that both fingerprints are of the same person. On the other hand, the identification task may include 1-to-n matching of the newly-captured fingerprint template with the stored fingerprint templates of "n" subjects to identify whether the current subject is one of them or not.

Figure 6:
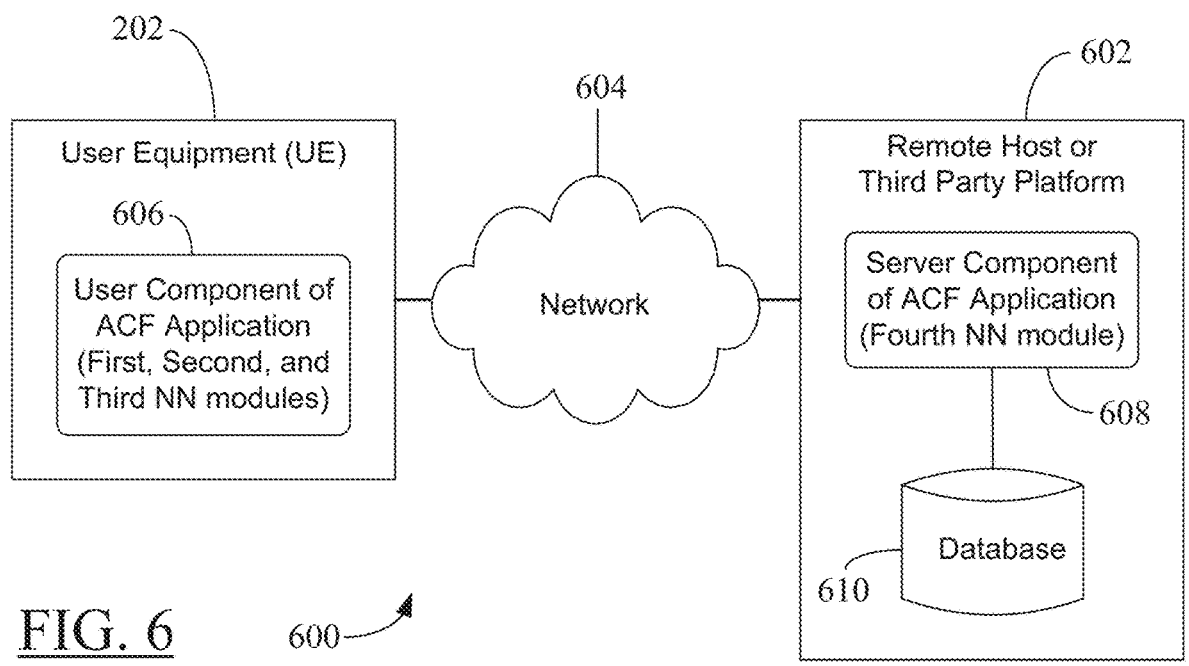
FIG. 6 depicts an exemplary system for remote implementation of fingerprint matching as per certain embodiments of the present disclosure.

FIG. 6 depicts an exemplary system 600 for remote implementation of fingerprint matching as per certain embodiments of the present disclosure. In the system 600, a remote host or third party platform (also interchangeably referred to as a host system or remote server) 602 is shown to be in communication with the UE 202 via a communication network 604. In the embodiment of FIG. 6, the functionality of the ACF application 100 may be divided between the UE 202 and the remote host 602. Hence, the UE 202 may include the program code of a user component (or user portion) 606 of the ACF application 100, whereas the remote host 602 may include the program code of a server component (or server portion) 608 of the ACF application 100. As shown in FIG. 6, the user component 606 may comprise the first, the second, and the third NN modules 102-104 (FIG. 1), respectively, and the server portion 608 may comprise the fourth NN module 105. In the embodiment of FIG. 6, each system 202, 602 may be operable to communicate with the other system via the communication network 604, which may be an Internet Protocol (IP) network, such as the Internet. However, in other embodiments, the host system 602 may individually communicate with the UE 202 via a different type of communication network that supports bi-directional communication. For example, the host system 602 may be connected to the UE 202 via a government intranet or a specific communication platform made available to the UE 202. In some embodiments, the UE 202 may send/receive content from the host system 602 through a wireless connection with the Internet 604. On the other hand, in some embodiments, the remote host 602 may be connected to the Internet 604 via a wired connection, such as an Ethernet connection. Furthermore, the host system 602 may be based on the Microsoft® Windows® OS (such as, for example, Windows 7, 8, or 10, and Windows NT operating systems) or any other OS (e.g., Mac™ OSX, Linux, etc.).

In one embodiment, the functionality of the user portion 606 of the ACF application 100 may be offered as a downloadable mobile app or a browser add-on. In some embodiments, the program code of the user portion 606 may be executed from within the web browser of the user's system 202 without the need to download the user portion 606 onto the user's system 202. In particular embodiments, the remote server 602 may store the program code of the user component 606 and offer such downloads to the supported mobile devices 202. In that case, the real-time image data captured by the UE 202 may be sent to the remote server 602 for further processing as per teachings of the present disclosure. In some embodiments, a program shortcut on the display screen 214 of the UE 202 may allow the user to download the user component 606 of the ACF application 100 into the UE 202 for execution as an interface when performing a fingerprinting operation. Similarly, the fingerprint matching functionality of the server component 608 of the ACF application 100 may be made available to the host system 602 to allow remote matching of fingerprint templates (which may be generated by the user component 606 in the UE 202), as discussed in detail later below.

The host system 602 may be associated with a government entity such as, for example, a police department or a law enforcement authority, that provides fingerprint matching support for police officers in the field, especially when it is not practicable or advisable to equip and continually update the field devices (such as mobile devices 202) with a large database of fingerprints. Thus, in particular embodiments, the remote server 602 may include a database 610 containing fingerprint details (such as, for example, processed contactless images, individual fingerprints, and corresponding fixed-length fingerprint templates) of different people. In some embodiments, the host system 602 may be associated with a third party that has been hired by a law enforcement agency to provide fingerprinting support to agency personnel in the field, for example, through a cloud-based Software as a Service (SaaS) platform or Infrastructure as a Service (IaaS) platform. In certain embodiments, such a third party may host a fingerprint database on its platform and provide the authorized personnel (such as police officers) an access to it as needed. In other embodiments, the third party simply may lease or license the ACF application 100 and its operational environment to the relevant government agency—for example, as a Platform as a Service (PaaS) product—to be implemented on the agency's own system/platform. It is understood that there may be multiple user terminals associated with the host system 602, and there may be multiple such host systems offering online fingerprinting support to various users throughout the nation. However, for ease of illustration and simplicity of discussion, only one of each such system 202, 602 is shown connected to the network 604. The discussion below in the context of a single UE 202 and a host 602 remains equally applicable to all users and remote servers providing or utilizing the functionality of the ACF application 100.

In certain embodiments, the functionality of the entire ACF application 100 or one or more of its components 606, 608 may be implemented in an online cloud environment. In this context, "cloud computing" or "cloud environment" refers to an online model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., SaaS, PaaS, or IaaS), and/or deployment models (e.g., private cloud, community cloud, public cloud, hybrid cloud, etc.).

As shown in FIG. 6, in particular embodiments, the server component 608 may be communicatively coupled to the database 610. Similarly, the user component 606 also may be communicatively coupled to the database 606 via its interactions with the server component 608 through the network 604. Various data generated during a fingerprinting operation such as, for example, processed contactless images generated by the user component 606 in real-time as well as corresponding fixed-length fingerprint templates generated by the server component 608; the program code of the server component 608 and APIs to external programs or applications; data about various fingerprints—such as, for example, enrollment information of a subject of the fingerprint, various scores (such as one or more of the scores 540 shown in FIG. 5K) associated with the fingerprints, identity of the authorized person providing the fingerprints, and the like; and other relevant information necessary to implement the fingerprint matching as per teachings of the present disclosure may be stored in the database 610. In certain embodiments, the program code of the user component 606 also may reside in the database 610 for download by users, for example, through a web browser or as an independent mobile app. It is noted that, in some embodiments, the database 610 may be an integral part of the host system 602 as shown, for example, in the embodiment of FIG. 6. In other embodiments, however, the database 610 or a portion thereof (for example, the portion storing fingerprint-related data) may be an external data storage unit (for example, a cloud-based data storage) that is communicatively coupled to the host system 602 for storage and retrieval of data. In certain embodiments, the database 610 may be implemented in software alone, or as a combination of hardware (for example, physical storage/memory) and software that manages the hardware (for example, a database management application). Additional architectural details of the host system 602 are provided later with reference to discussion of FIG. 8.

Figure 7:
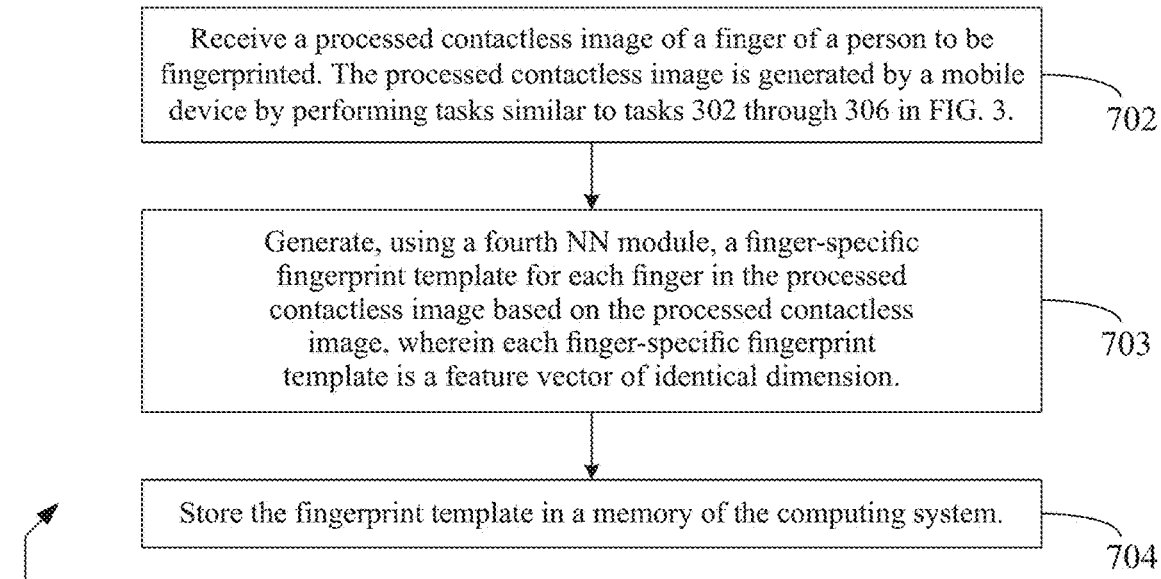
FIG. 7 is an exemplary flowchart depicting various steps that may be performed by a computing system as per particular embodiments of the present disclosure to facilitate AI-based fingerprint template generation and matching as per teachings of the present disclosure.

In particular embodiments, the functionality of the ACF application 100 may be accomplished when the program codes of its components 606, 608 are executed by processors in respective systems 202, 602. Each module 606, 608 may be a software application comprising program code, which, upon execution by a processor in the respective system 202, 602, may enable the systems 202, 602 to jointly perform different operations to facilitate the AI-based contactless fingerprint generation and matching as per teachings of the present disclosure. An exemplary set of such operations is illustrated in FIG. 7, which is discussed later below. More generally, the server component 608, upon execution, may enable the host system 602 to receive, store, and analyze the content received from the UE 202 (such as, for example, data related to a processed contactless image of a finger) and also from other sources (such as, for example, from an external website or data provider, from an external database, and the like); responsively manage and process the content to perform fingerprint template generation and matching using the fourth NN module 105 (FIG. 1); and offer the results of the processing to the user component 606 for display/presentation on the UI 214 of the user's device 202. Similarly, the user portion 606, upon execution, may enable the UE 202 to capture a fingerprint image in a contactless manner in real-time and process it using the three NN modules 102-104; transmit the data related to a processed contactless image to the server component 608 in the remote host 602; and receive, store, and display the content (such as, fingerprint matching results) received from the remote host 602 in real-time as per teachings of the present disclosure. Thus, in some embodiments, the host system 602 may function as a "server", whereas the UE 202 may function as a "client" of the host system 602. It is noted, however, that the client-server based arrangement is only one example of how the fingerprinting methodology of the present disclosure may be implemented. In some embodiments, the functionality of the ACF application 100 may be implemented in a non-server system as well. The non-server system, for example, may be the mobile device 202 itself that implements the functionalities of the user portion 606 as well as the server portion 608 on a single platform.

Figure 8:
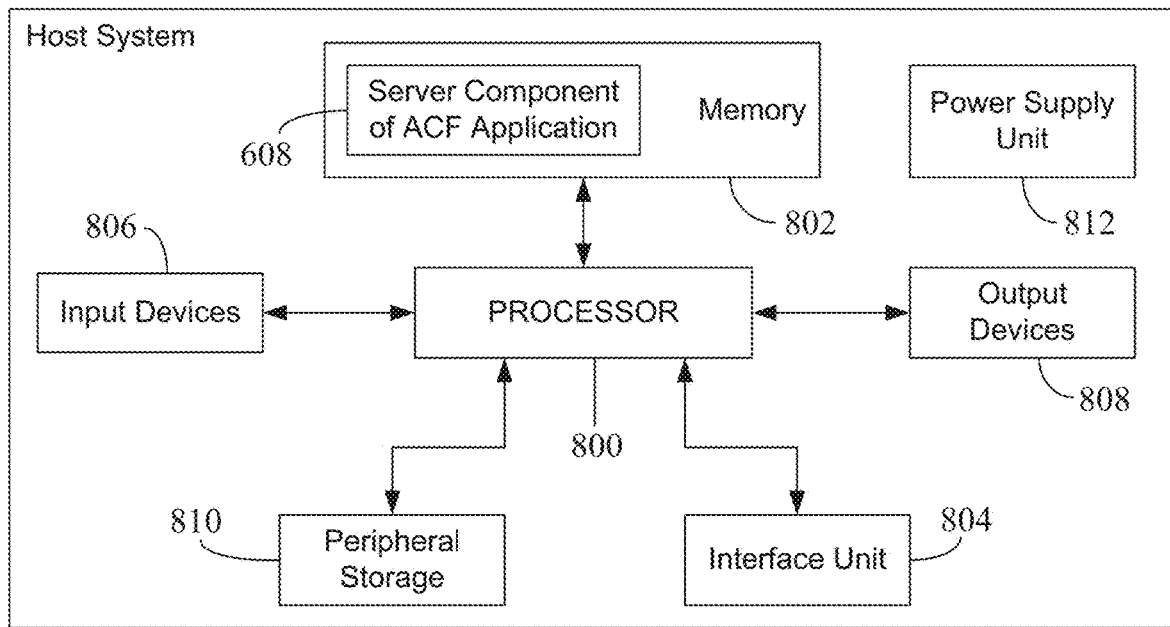
FIG. 8 illustrates an example configuration of the host system of FIG. 6 that can be used to implement the methodology shown in the flowchart of FIG. 7.

As mentioned before, in some embodiments, the program code constituting the server portion 608 may be stored in the database 610 associated with the host system 202, whereas the program code of the user component 606 may be stored in the memory 212 in the UE 202. These program codes may be executed by a processor in the respective system 202, 602 under operative control of a respective Operating System (OS). Such memory, processor, and other exemplary architectural details of the UE are shown in FIG. 2 and that of the host system 602 are shown in FIG. 8 and discussed later below. In one embodiment, at least a portion of the program code for the ACF application 100 may be based on Open Source Software (OSS). In some embodiments, the ACF application 100 may be associated with one or more computing systems (not shown) managed by a server that coordinates content delivery to/from these computing systems to the systems 202, 602. The architectural configuration, layout, appearance, or content of such a server based configuration are not relevant to the present disclosure and, hence, no additional details thereof are provided here.

FIG. 7 is an exemplary flowchart 700 depicting various steps that may be performed by a computing system, such as the remote host 602 in FIG. 6, as per particular embodiments of the present disclosure to facilitate AI-based fingerprint template generation and matching as per teachings of the present disclosure. As noted before, in the embodiment of FIG. 7, the functionality of the ACF application 100 may be performed collectively by the systems 202 and 602. Thus, initially, at block 702 in FIG. 7, the computing system (such as the host system 602) may receive a processed contactless image of a finger of a person to be fingerprinted. In certain embodiments, the processed image may contain more than one finger, as discussed before. As noted at block 702, the mobile device 202 may utilize the user component 606 to perform the tasks similar to the tasks at blocks 302 through 306 in FIG. 3 (and also relevant tasks in FIGS. 4A-4B) to generate the processed contactless image. Because of earlier discussion of FIGS. 3 and 4A-4B, such tasks are not described here for the sake of brevity. In one embodiment, the mobile device 202 may transmit the data associated with the processed contactless image to the remote host 602 via the network 604.

At block 703, the computing system (here, the host system 602) may use the fourth NN module in the server component 608 to generate a fingerprint template for the finger in the processed contactless image. As also noted at block 703, the fingerprint template may be generated using the processed contactless fingerprint image. If the processed contactless image contains fingerprint data associated with multiple fingers, the computing system may generate a finger-specific fingerprint template for each such finger. The earlier discussion of AI-based generation of fixed-length fingerprint templates remains applicable here and, hence, is not repeated for the sake of brevity. At block 704, the computing system 602 may store the fingerprint template(s) (generated at block 703) in a memory of the computing system—such as the database 610—for future use, such as, for example, in fingerprint matching or remote enrolment, as discussed below. It is observed that the tasks at blocks 703-704 are substantially similar to the tasks 307-308 in FIG. 3 and, hence, are not discussed in any additional detail. It is noted, however, that the tasks at blocks 703-704 are performed remotely at the remote server 602 by the server component 608 in FIG. 6, whereas the tasks 307-308 are performed locally at the user's mobile device 202 by the ACF application 100 in FIG. 2.

In one embodiment, the saved fingerprint template(s) (at block 704) may be used by the server component 608 to enroll the corresponding human subject/user in the database 610. Such enrollment (or digital on-boarding) may include, for example, collecting and storing the identifying information of the subject (such as, for example, the name, address, gender, race, and the like) and linking or associating the fingerprint template(s) with the corresponding subject. In one embodiment, at least some portion of the identifying information may have been received by the server component 608 from the user component 606 when, for example, the operator (such as a police officer) enters the subject name, ID, and the like in the field 502 shown in the screenshot 500 in FIG. 5A, as discussed before.

In the embodiment of FIGS. 6-7, the earlier-discussed mathematical fingerprint matcher may be implemented on the host system 602. Furthermore, in the embodiment of FIGS. 6-7, the database 610 may be used to store the processed contactless image, individual fingerprints/templates, enrolment information of various subjects, and fingerprints (or corresponding fixed-length fingerprint templates) of various human subjects such as, for example, criminals or suspicious actors. Thus, in case of remote verification and identification at the host system 602, the fingerprint matcher may be used by the server component 608 to compare a newly-captured fingerprint image/template with the reference images/templates stored in the database 610 for online verification and identification. If the identity of a subject is known or if the subject's fingerprint(s) are already enrolled in the fingerprint gallery in the system database 610, the verification task may include 1-to-1 matching of the newly-captured fingerprint template of a specific finger with a previously-captured fingerprint template of the same finger of the same subject to verify that both fingerprints are of the same person. In that case, the remote host 602 may output the identity of the matched enrolled user and send it to the user component 606 via the network 604 for display on the UE's 202 display screen 214. On the other hand, the identification task at the remote server 602 may include 1-to-n matching of the newly-captured fingerprint template with the stored fingerprint templates of "n" subjects to identify whether the current subject is one of them or not.

It is noted that, generally, the functionality of the ACF application 100 may support contactless-to-contactless fingerprint matching as well as contactless-to-contact based fingerprint matching. The fixed-length feature vector based matching of two fingerprints generated in a contactless manner is already discussed before with reference to the cosine similarity function based matching using a neural network based ML model (such as the fourth NN module 105 in FIG. 1). As also discussed before, such ML-based matching may be performed either locally at the mobile device 202 or remotely at the host system 602. Similarly, in particular embodiments, a contactless fingerprint captured using the teachings of the present disclosure may be matched with a contact-based fingerprint image as well using the same neural network based ML model. It is observed that a contact-based fingerprint image is a fingerprint extracted from a contact-based fingerprint scanner. The ML model (such as the fourth NN module 105) may extract features from the contact-based fingerprint image and generate a corresponding fixed-length feature vector in the manner similar to that discussed before with reference to contactless images. Thereafter, the extracted feature representations (of contactless and/or contact-based fingerprint images) may be optionally sent to the remote server 602 for a de-duplication check and enrollment (digital on-boarding) or may be used locally on the mobile device 202 for a verification check against reference features stored on the mobile device if the person was already enrolled (offline authentication). This approach may be used for both verification (1-to-1 matching) and identification (1-to-n matching), which can be performed locally or remotely.

The foregoing discussion of FIGS. 1-7 illustrates how an AI-based contactless fingerprinting and matching may be performed locally on a mobile device of a user or remotely at a host system. In summary, it is noted that the ACF application 100 as per teachings of the present disclosure may perform some or all of the following depending on the desired implementation: (i) Optimize UE's camera settings for better quality of captured fingerprints. (ii) AI-based detection of fingers along with their size and direction, and also detection of wrong hand. (iii) Real-time focus assessment and best frame selection based on optimal focus. (iv) Automatic detection of finger position. (v) Display of ellipses over the fingers during capture for convenience. This may be more accurate than showing rectangles over fingers. (vi) Noise filtering for finger processing. (vii) Fingerprint distortion correction (3D perspective to 2D perspective). (viii) Scaling of fingerprint images to approximately 500 dpi resolution using depth information. (ix) Generation of legacy-compliant grayscale fingerprint images using image processing. (x) AI-based fingerprint liveness detection. (xi) AI-based fingerprint feature extraction and matching. (xii) Generation of fixed-length feature vectors/templates, irrespective of the number of minutiae points.

FIG. 8 illustrates an example configuration of the host system (or computer system) 602 of FIG. 6 that can be used to implement the methodology shown in the flowchart of FIG. 7. The host system 602 may be suitably configured to implement some of the functionality of the ACF application 100 according to the teachings of the present disclosure. Thus, in the embodiments of FIGS. 6-8, the host system 602 may execute only a portion of the ACF application—for example, the server component 608. However, it is noted that, if desired, the host system 602 may be configured to implement some or all of the functionality of the user component 606 as well in a remote manner such as, for example, when the UE 202 is not capable of or not preferred to perform such tasks locally. In that case, the earlier discussion of FIGS. 2-5 in the context of the UE 202 apply to the host system 602 so configured.

The host system 602 may include one or more processors 800, a memory unit 802, an interface unit 804 providing communication interfaces, one or more input devices 806, one or more output devices 808, and a peripheral storage unit 810, connected to the processor 800 as shown and configured to communicate with each other, such as via one or more system buses (not shown) or other suitable connection. In one embodiment, the input devices 806 may provide operator inputs—such as, for example, messages or commands related to the administration of the system 602, service related inputs (for example, rectifying a subject's enrolment data or managing a user's account), responses to queries from a user/operator of a mobile device in the field, modification of fingerprint-related messaging as per user's requirements, and the like—to the processor 800 and the server component 608 for further processing. In the context of FIG. 8, the operator of the host system 602 may refer to an authorized person who is in charge of operating the system 602. The input devices 806 may include, for example, a touchpad, a camera, a computer keyboard, a touch-screen, a joystick, a physical or virtual "clickable button," a computer mouse/pointing device, and the like.

A display screen is an example of the output device 808. Other examples of an output device include a graphics/display device, a computer screen or monitor, an alarm system, or any other type of data output device. In some embodiments, the input device(s) 806 and the output device(s) 808 may be coupled to the processor 800 via an I/O or peripheral interface(s). In some embodiments, the computer system 602 may include more than one instance of the devices shown. In various embodiments, all the components shown in FIG. 8 may be housed within a single housing. In other embodiments, the computer system 602 may not include all of the components shown in FIG. 8. Furthermore, the computing system 602 may be configured as a standalone system, as a server system, as a client system (of another server), as a cluster of networked computers, as a virtual machine (e.g., within a cloud computing system), or in any other suitable form factor.

The processor 800 is a hardware device that may include a single processing unit or a number of processing units, all of which may include single or multiple computing units or multiple cores. When the host system 602 is a multiprocessor system, there may be more than one instance of the processor 800 or there may be multiple other processors coupled to the processor 800 via their respective interfaces (not shown). The processor 800 may include an integrated Graphics Processing Unit (GPU) or the GPU may be a separate processor device in the system 602. The processor 800 may be implemented as one or more microprocessors, microcomputers, microcontrollers, Digital Signal Processors (DSPs), Central Processing Units (CPUs), Graphics Processing Units (GPUs), state machines, logic circuitries, virtual machines, and/or any devices that manipulate signals based on operational instructions. Among other capabilities, the processor 800 may be configured to fetch and execute computer-readable instructions stored in the memory 802, the peripheral storage 810, or other computer-readable media. In some embodiments, the processor 800 may be a System on Chip (SoC).

The memory 802 and the peripheral storage unit 810 are examples of non-transitory computer media (e.g., memory storage devices) for storing instructions that can be executed by the processor 800 to perform the various functions described herein. In some embodiments, the memory 802 and the peripheral storage unit 810 may include tangible, computer-readable data storage media. For example, the memory unit 802 may include both volatile memory and nonvolatile memory (e.g., RAM, ROM, or the like) devices. Further, in particular embodiments, the peripheral storage unit 810 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 802 and mass storage devices constituting the peripheral storage 810 may be collectively referred to as "memory" or "computer storage media" herein and may be a media capable of storing computer-readable, processor-executable program instructions as computer program code that can be executed by the processor 800 as a particular machine (or special purpose machine) configured for carrying out the operations and functions described in the implementations herein. In some embodiments, the database 610 (FIG. 6) may be a part of such computer storage media. In other embodiments, such computer storage media may be an online cloud-based storage.

The computing device 602 also may include one or more communication interfaces as part of its interface unit 804 for exchanging data via a network (such as the communication network 604 in FIG. 6). The communication interfaces can facilitate communications within a wide variety of networks and protocol types, including wired networks (e.g., Ethernet, Digital Subscriber Loop (DSL), Data Over Cable Service Interface Specification (DOC SIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the IP network 206), and the like. Communication interfaces in the interface unit 804 can also provide communication with an external storage (not shown), such as in a storage array, network attached storage, storage area network, one or more databases, or the like. For example, if the database 610 in FIG. 6 is implemented as an external storage, the interface unit 804 may facilitate communication with that database. Similarly, the interface unit 804 may facilitate communication between the host system 602 and the UE 202 via the network 604 for the exchange of various data and contents as described before.

The computer storage media, such as the memory 802 and the mass storage devices in the peripheral storage 810, may be used to store software and data. For example, the computer storage media may be used to store the operating system (OS) for the computing device 602; various device drivers for the device 602; various inputs provided by the operator of the device 602, received from the UE 202 (for example, fingerprint-related data of a subject, name and other identifying information of the subject, and so on), or generated by the system 602 (for example, user's fingerprint template(s), results of fingerprint matching operations, and so on) at run-time during the implementation of the fingerprinting methodology discussed before with reference to FIGS. 6-7; and the data such as fingerprint images, text data (for example, a user's enrolment information), or any other type of content. The computer storage media also may store software applications such as a word processing application, a spreadsheet application, a payment application, the server component of the ACF application 608, and the like. The program code for the software applications and the OS may be executed by the processor 800.

In one embodiment, a non-transitory, computer-readable data storage medium, such as, for example, the system memory 802 or the peripheral data storage unit 810, may store program code or software for the server portion 608 as per particular embodiments of the present disclosure. In the embodiment of FIG. 8, the system memory 802 is shown to include such program code. Such computer-readable data storage medium may be considered an article of manufacture. In the embodiment of FIG. 8, the server component 608 may operate in conjunction with the OS (not shown) of the computing system 602. The processor 800 may be configured to execute the program code for the server component 608, whereby the host system 602 may be operative to perform various fingerprinting related tasks in conjunction with the mobile device 202 as per the teachings of the present disclosure. In particular embodiments, such tasks may include, for example, the process steps illustrated in FIG. 7 as well as other relevant tasks discussed with reference to FIG. 6 such as, for example, real-time reception of fingerprint data of a user, real-time generation of fixed-length fingerprint template(s) for user's finger(s) to be fingerprinted, real-time matching of fingerprint templates, and so on. The program code or software for the server component 608 may be proprietary software and/or open source software which, upon execution by the processor 800, may enable the computer system 602 to perform operations in conjunction with the UE 202 to collectively implement the AI-based contactless fingerprinting as per teachings of the present disclosure. As a result, the computer system 602 may operate as a special purpose system/device.

In particular embodiments, the computing device 602 may include an on-board power supply unit 812 to provide electrical power to various system components illustrated in FIG. 8. The power supply unit 812 may receive batteries and/or may be connectable to an AC electrical power outlet. In one embodiment, the power supply unit 812 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the ACF application 100 (including the software modules 102-105 shown in FIG. 1), that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
    capturing, by a computing system and in a contactless manner, an optical image of a portion of a palm of a hand;
    extracting, by the computing system, a plurality of finger-specific visual landmarks for each finger in the captured image using a first neural network (NN) module;
    detecting, by the computing system, a size and a direction of each finger in the captured image based on the plurality of finger-specific visual landmarks;

cropping, by the computing system, the captured image based on the size and the direction of each finger therein to thereby generate a cropped image;

processing, by the computing system and using a second and a third NN modules, the cropped image to obtain a processed contactless image;

generating, by the computing system and using a fourth NN module, a finger-specific fingerprint template for each finger in the processed contactless image based on the processed contactless image, wherein each finger-specific fingerprint template is a feature vector of identical dimension; and storing, by the computing system, each finger-specific fingerprint template in a memory of the computing system.

2. The method of claim 1, wherein the cropping includes:
displaying, by the computing system, a finger-specific ellipse around each finger in the cropped image based on the detected size and direction of the finger to thereby visually identify the finger.

3. The method of claim 1, further comprising:
transmitting, by the computing system, at least one finger-specific fingerprint template stored in the memory to a remote server.

4. The method of claim 1, further comprising:
comparing, by the computing system, two fingerprint templates stored in the memory using a mathematical function to generate a comparison score; and determining, by the computing system, that compared fingerprint templates match with each other when the comparison score is above a pre-defined threshold.

5. The method of claim 4, wherein the mathematical function is a cosine similarity function and the comparison score is a cosine similarity score.

6. The method of claim 1, further comprising performing, by the computing system and based on the plurality of finger-specific visual landmarks, at least one of the following as part of the processing:

determining whether a number of fingers detected in the cropped image is correct for a type of image capture selected by a user, and providing a first feedback to the user when the number of fingers is incorrect;

determining whether the optical image of a correct hand is captured for the type of image capture selected by the user, and providing a second feedback to the user when the optical image is of an incorrect hand; and determining whether each imaged finger is positioned at an acceptable distance from a camera of the computing system that captured the optical image, and providing a third feedback to the user when an imaged finger is positioned at an unacceptable distance from the camera.

7. The method of claim 1, wherein the processing comprises performing the following by the computing system using the second NN module:

analyzing the cropped image to determine if a fingernail is visible therein;

based on the analysis, computing a score representing a probability of fingernail visibility in the cropped image; and alerting a user when the score exceeds a pre-determined threshold.

8. The method of claim 1, wherein the processing comprises performing the following by the computing system using the third NN module:

confirming that a user has selected to capture only a thumb in the optical image;

analyzing the cropped image to compute a score representing a probability of the thumb being of a left hand or a right hand, wherein a correct hand is either the left hand or the right hand as pre-selected by the user at the time of capture of the optical image; and alerting the user when the score signifies detection of the thumb of an incorrect hand.

9. The method of claim 1, wherein the processing comprises performing the following by the computing system:
analyzing the cropped image to identify a plurality of artifacts therein, wherein the plurality of artifacts includes the following:
skin color of each finger,
one or more moire patterns, and
image noise;

computing a liveness score based on the plurality of artifacts;

determining that the liveness score is below a pre-defined threshold;

based on the determination, concluding that no finger in the cropped image is a fake finger; and informing a user of the conclusion.

10. The method of claim 1, wherein the processing comprises performing at least one of the following by the computing system:

reducing image noise in the cropped image;

correcting curvature-based distortions in each imaged finger in the cropped image based on a three dimensional (3D) depth map of the imaged finger;

scaling the cropped image to a substantially 500 dpi resolution;

converting the cropped image, obtained in the contactless manner, to resemble a contact-based fingerprint image;

computing a finger-specific National Institute of Standards and Technology Fingerprint Image Quality 2 (NIST NFIQ2) score for each imaged finger in the cropped image; and displaying each finger-specific NIST NFIQ2 score on a display screen of the computing system along with the processed contactless image.

11. The method of claim 10, further comprising:
obtaining, by the computing system, the 3D depth map using one of the following:
a Time-of-Flight (ToF) sensor of the computing system, and
a Light Detection and Ranging (LiDAR) sensor of the computing system.

12. The method of claim 1, further comprising:
creating, by the computing system, a finger-specific International Organization for Standardization 19794-2 (ISO 19794-2) compliant Minutiae Interoperability Exchange (MINEX) template using the processed contactless image;

storing, by the computing system, each finger-specific MINEX template in the memory;

generating, by the computing system, a compressed image from the processed contactless image in at least one of the following image formats:
an ISO 19794-4 compliant Wavelet Scalar Quantization (WSQ) image format,
a bitmap (BMP) image format, and
a Portable Network Graphic (PNG) image format; and further storing, by the computing system, the compressed image in the memory.

13. A method comprising: receiving, by a first computing system, a processed contactless image of a first finger of a first person to be fingerprinted, wherein the processed contactless image is generated by a second computing system by:
  capturing an optical image of the first finger in a contactless manner,
  extracting a plurality of visual landmarks for the first finger in the captured image using a first neural network (NN) module,
  detecting a size and a direction of the first finger in the captured image based on the plurality of visual landmarks,
  cropping the captured image based on the size and the direction of the first finger therein to thereby generate a cropped image, and
  processing the cropped image using a second and third NN modules to obtain the processed contactless image;
  generating, by the first computing system and using a fourth NN module, a first fingerprint template for the first finger in the processed contactless image based on the processed contactless image wherein the first fingerprint template is a feature vector whose length is fixed and independent of number of minutiae points in a plurality of the minutiae points; and
  storing, by the first computing system, the first fingerprint template in a memory of the first computing system.

14. The method of claim 13, further comprising:
  comparing, by the first computing system and using a cosine similarity function, the first fingerprint template against a second fingerprint template of a second finger stored in the memory to generate a cosine similarity score, wherein the first and the second fingerprint templates are feature vectors of identical length;
  determining, by the first computing system, that the first and the second fingerprint templates match with each other when the cosine similarity score is above a pre-defined threshold; and
  based on the determination, concluding, by the first computing system, that the first and the second fingers are identical.

15. The method of claim 14, further comprising:
  associating, by the first computing system, an identity of a second person with the second fingerprint template;
  storing, by the first computing system, the identity of the second person in the memory; and
  based on the determination, identifying, by the first computing system, the first person as having the identity of the second person.

16. A mobile device comprising:
  a camera;
  a memory for storing program instructions comprising a first neural network (NN) module, a second NN module, a third NN module, and a fourth NN module; and
  a processor coupled to the camera and to the memory, wherein the processor executes the program instructions and performs each of following upon the execution of the program instructions:
    captures, using the camera, an optical image of at least one finger of a hand in a contactless manner;
    extracts a plurality of finger-specific visual landmarks for each finger in the captured image using the first NN module;
    detects a size and a direction of each finger in the captured image based on the plurality of finger-specific visual landmarks;
    crops the captured image based on the size and the direction of each finger therein to thereby generate a cropped image;
    processes the cropped image using the second and the third NN modules to obtain a processed contactless image;
    generates, using the fourth NN module, a finger-specific fingerprint template for each finger in the processed contactless image based on the processed contactless image, wherein each finger-specific fingerprint template is a feature vector of identical dimension; and
    stores each finger-specific fingerprint template in the memory.

17. The mobile device of claim 16, further comprising a display screen coupled to the processor, wherein the processor further performs at least one of following upon the execution of the program instructions:
  displays on the display screen a finger-specific ellipse around each finger in the cropped image based on the detected size and direction of the finger to thereby visually identify the finger;
  determines whether a number of fingers detected in the cropped image is correct for a type of image capture selected by a user, and provides a first feedback to the user on the display screen when the number of fingers is incorrect;
  determines whether the optical image of a correct hand is captured for the type of image capture selected by the user, and provides a second feedback to the user on the display screen when the optical image is of an incorrect hand; and
  determines whether each imaged finger is positioned at an acceptable distance from the camera, and provides a third feedback to the user on the display screen when an imaged finger is positioned at an unacceptable distance from the camera.

18. The mobile device of claim 17, wherein the processor further performs at least one of following upon the execution of the program instructions:
  analyzes the cropped image using the second NN module and provides a first alert to the user on the display screen if a fingernail is present in the cropped image;
  analyzes the cropped image using the third NN module and provides a second alert to the user on the display screen if a thumb of an incorrect hand is detected; and
  analyzes the cropped image to conclude that no finger in the cropped image is a fake finger and provides a third alert on the display screen informing the user of the conclusion.

19. The mobile device of claim 16, further comprising a display screen coupled to the processor, wherein the processor performs each of following upon the execution of the program instructions:
  compares two fingerprint templates stored in the memory using a cosine similarity function to generate a cosine similarity score;
  determines that the cosine similarity score is above a pre-defined threshold;
  concludes that compared fingerprint templates match with each other; and
  displays the conclusion on the display screen.

20. The mobile device of claim 16, further comprising:
  a display screen coupled to the processor; and
  a three dimensional (3D) depth sensor, wherein the 3D depth sensor is one of following:
    a Time-of-Flight (ToF) sensor, and a Light Detection and Ranging (LiDAR) sensor; wherein the processor performs each of following upon the execution of the program instructions:
- using the 3D depth sensor, obtains a corresponding 3D depth map of each imaged finger in the cropped image;
- corrects curvature-based distortions in each imaged finger in the cropped image based on the corresponding 3D depth map of the imaged finger;
- scales the cropped image to a substantially 500 dpi resolution;
- based on the correction of curvature-based distortions, converts the cropped image to resemble a contact-based fingerprint image;
- computes a finger-specific National Institute of Standards and Technology Fingerprint Image Quality 2 (NIST NFIQ2) score for each imaged finger in the cropped image; and
- displays each finger-specific NIST NFIQ2 score on the display screen along with the processed contactless image.

* * * * *